(12) United States Patent
Baek et al.

(10) Patent No.: US 12,390,051 B2
(45) Date of Patent: Aug. 19, 2025

(54) BLENDER

(71) Applicant: LG ELECTRONICS INC., Seoul (KR)

(72) Inventors: Inwoo Baek, Seoul (KR); Yangho Kim, Seoul (KR); Kijoong Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 821 days.

(21) Appl. No.: 17/639,243

(22) PCT Filed: Aug. 5, 2020

(86) PCT No.: PCT/KR2020/010328
§ 371 (c)(1),
(2) Date: Feb. 28, 2022

(87) PCT Pub. No.: WO2021/040260
PCT Pub. Date: Mar. 4, 2021

(65) Prior Publication Data
US 2022/0322884 A1   Oct. 13, 2022

(30) Foreign Application Priority Data
Aug. 29, 2019 (KR) .................. 10-2019-0106700

(51) Int. Cl.
*A47J 43/00* (2006.01)
*A47J 43/07* (2006.01)

(52) U.S. Cl.
CPC ....... *A47J 43/0766* (2013.01); *A47J 43/0722* (2013.01)

(58) Field of Classification Search
CPC .................. A47J 43/0766; A47J 43/0722
See application file for complete search history.

(56) References Cited

U.S. PATENT DOCUMENTS

| 2002/0176320 | A1 | 11/2002 | Wulf et al. |
| 2008/0221739 | A1 | 9/2008 | Pryor et al. |
| 2008/0264270 | A1 | 10/2008 | Peng |
| 2015/0265983 | A1 | 9/2015 | Fleming |
| 2016/0309960 | A1* | 10/2016 | Kolar .................. A47J 43/0761 |
| 2017/0086623 | A1* | 3/2017 | Lee ..................... B01F 35/3204 |
| 2018/0206677 | A1 | 7/2018 | Ivarsson et al. |
| 2019/0000273 | A1 | 1/2019 | Sapire |

FOREIGN PATENT DOCUMENTS

| CA | 3067616 A1 | 1/2019 |
| CN | 106510495 A | 3/2017 |
| EP | 2937027 B1 | 3/2017 |
| KR | 10-1448681 B1 | 10/2014 |
| KR | 10-2017-0033818 A | 3/2017 |
| WO | 2017/063962 A1 | 4/2017 |

* cited by examiner

*Primary Examiner* — Anshu Bhatia
(74) *Attorney, Agent, or Firm* — Bryan Cave Leighton Paisner LLP

(57) ABSTRACT

The present invention relates to a blender. The blender includes: a body provided with a motor assembly; a container which is detachably mounted to the body and in which food is accommodated; a blade module provided inside the container and connected to the motor assembly to rotate when the container is mounted; a detection member provided in the container; and a detection device provided on one side of the body corresponding to the detection member and detecting the detection member when the container is mounted.

14 Claims, 21 Drawing Sheets

BLENDER

This application is a National Stage Application of International Application No. PCT/KR2020/010328, filed on Aug. 5, 2020, which claims the benefit of and priority to Korean Patent Application No. 10-2019-0106700, filed on Aug. 29, 2019, which are hereby incorporated by reference in their entirety for all purposes as if fully set forth herein.

TECHNICAL FIELD

The present disclosure relates to a blender.

BACKGROUND

In general, a blender is a home appliance that cuts food contained in a container by a blade rotated by an electric motor, crushes food into powder, or makes food into a liquid-like state, and is also commonly referred to as a blender.

In a general blender, a container is seated on a top surface of a body in which a motor is embedded, and when the container is seated, a blade inside the container is connected to a rotation shaft of the motor to be in a rotatable state. In addition, the user may drive the motor by manipulating the body after putting the food in the container, and the blade may rotate by the driving of the motor to crush the food.

Such a blender has recently been developed as a large-capacity blender with a large container, and also, a blender using a motor rotating at a high speed to more effectively crush various foods is being developed.

In addition, the blender may have various manipulation structures to facilitate the crushing operation of various foods.

International Patent Publication No. PCT/EP2016074116 discloses a control button for rotation operation on a front surface of a base part on which a container is seated. Disclosed is a blender in which a user manipulates a control button to operate the blender according to a preset cooking program, and the operation of the blender can be inputted by a user's simple manipulation.

However, in the blender having such a structure, there is a somewhat an inconvenient problem in use, such as having to directly set and input a desired operation and select a manipulation.

In addition, even in a state in which the container is not seated on the base part, a motor inside the base part may be operated by a user's manipulation, which may cause a safety problem.

DISCLOSURE

Technical Problem

An embodiment of the present disclosure aims to provide a blender that enables a motor assembly to operate in a state in which seating of a container is sensed.

An embodiment of the present disclosure aims to provide a blender capable of recognizing a container regardless of the mounting direction and a state of a container.

An embodiment of the present disclosure aims to provide a blender capable of automatically setting an operation suitable for a detected container by detecting the type of the container installed therein.

Technical Solution

A blender according to an embodiment of the present disclosure includes: a body provided with a motor assembly; a container which is detachably mounted to the body and in which food is accommodated; a blade module provided inside the container and connected to the motor assembly to rotate when the container is mounted; a detection member provided in the container; and a detection device provided on one side of the body corresponding to the detection member and detecting the detection member when the container is mounted.

A container coupling portion protruding downward and provided with the detection member may be defined on a bottom surface of the container, and a container seating portion may be defined on a top surface of the body, the container seating portion being recessed so that the container coupling portion is inserted when the container is mounted and the detection device is mounted thereon.

The container coupling portion may extend downward at a position away from a center of the container by a set radius, the detection member may be disposed along a circumference of the container coupling portion, an inner surface of the container seating portion may be in contact with an outer surface of the container coupling portion, and the detection device may be provided in the container seating portion facing the detection member.

A plurality of coupling guides protruding outward at equal intervals may be defined around the container coupling portion, and a plurality of coupling support portions supporting an outer surface of the container coupling portion and spaced apart from each other at equal intervals, and a guide coupling groove into which the coupling guide is inserted between the coupling support portions spaced apart from each other may be defined on an inner surface of the container seating portion.

At least one detection member may be disposed between the adjacent coupling guides.

The detection device may be provided in the coupling support portion.

The detection device may be disposed to be symmetrical at positions facing each other among the plurality of coupling support portions.

An inner surface and an outer surface of the container seating portion may be spaced apart from each other, and a detection device accommodation portion which is opened downward and into which the detection device is inserted and mounted may be defined between the outer surfaces of the container seating portion.

The detection device may include: a detection portion which is inserted into the detection device accommodation portion and at least a portion of which is located at a position facing the detection member to detect the detection member; and a bracket portion on which the detection portion is mounted and which is coupled to an inner surface of the body from an outside of the detection device accommodation portion.

A plurality of the detection members may be arranged radially with respect to a center of the container, and the detection device may be disposed radially with respect to the center of the body, and may be disposed at a position corresponding to a portion of the detection member.

One of a plurality of containers may be selectively mounted on the container seating portion, and the plurality of containers may be configured to have a different arrangement position of the detection member, and may determine a type of the mounted container according to the arrangement of the detection member recognized by the detection device.

One of a plurality of the containers may be selectively mounted on the container seating portion, and the plurality of containers may be configured to have a different arrangement number of the detection member, and may determine a type of the mounted container according to the arrangement of the detection member recognized by the detection device.

The blender may be set to an operation mode suitable for the container recognized when the type of the container is determined.

The detection member may be a magnet, and the detection device may be a Hall sensor that detects the magnet.

The detection member may be an RFID tag, and the detection device may be an RFID reader recognizing the RFID tag.

Advantageous Effects

The blender according to the embodiment of the present disclosure may have the following effects.

The detection member may be provided in the container, and the detection device configured to detect the detection member may be provided in the body so that the motor assembly is driven after detecting the mounting of the container. Therefore, the blender does not operate when the container is not mounted, and operates only when the container is recognized, thereby preventing a safety accident due to a user's erroneous operation or carelessness and ensuring operation reliability.

In addition, the detection member is provided on the circumferential surface of the container coupling portion coupled to the body, and the detection device is provided on the inner surface of the container seating portion in which the container coupling portion is accommodated. Thus, when the container is mounted, the detection member and the detection device may be arranged to face each other, so that it is possible to ensure the detection of the detection member.

In addition, the detection member and the detection device may be circularly arranged at a set interval so that the detection member may always be recognized by the detection device regardless of the different mounting directions of the container on the body.

In addition, due to the coupling guide and the guide coupling groove for guiding the seating of the container, the container may be mounted in an aligned state at all times, and it is possible to ensure that the detection member is detected by the detection device when the container is mounted.

In addition, the detection device may identify the type of the container according to the information or arrangement and number of detection members provided in the container. Therefore, when the user mounts the container, the blender may automatically set the appropriate operation for the container, and the user's convenience may be greatly improved by allowing the user to perform an optimized operation by a simple manipulation.

DETAILED DESCRIPTION

Hereinafter, detailed embodiments will be described in detail with reference to the accompanying drawings. However, the scope of the present disclosure is not limited to proposed embodiments of the present invention, and other regressive inventions or other embodiments included in the scope of the spirits of the present disclosure may be easily proposed through addition, change, deletion, and the like of other elements.

Figure 1:
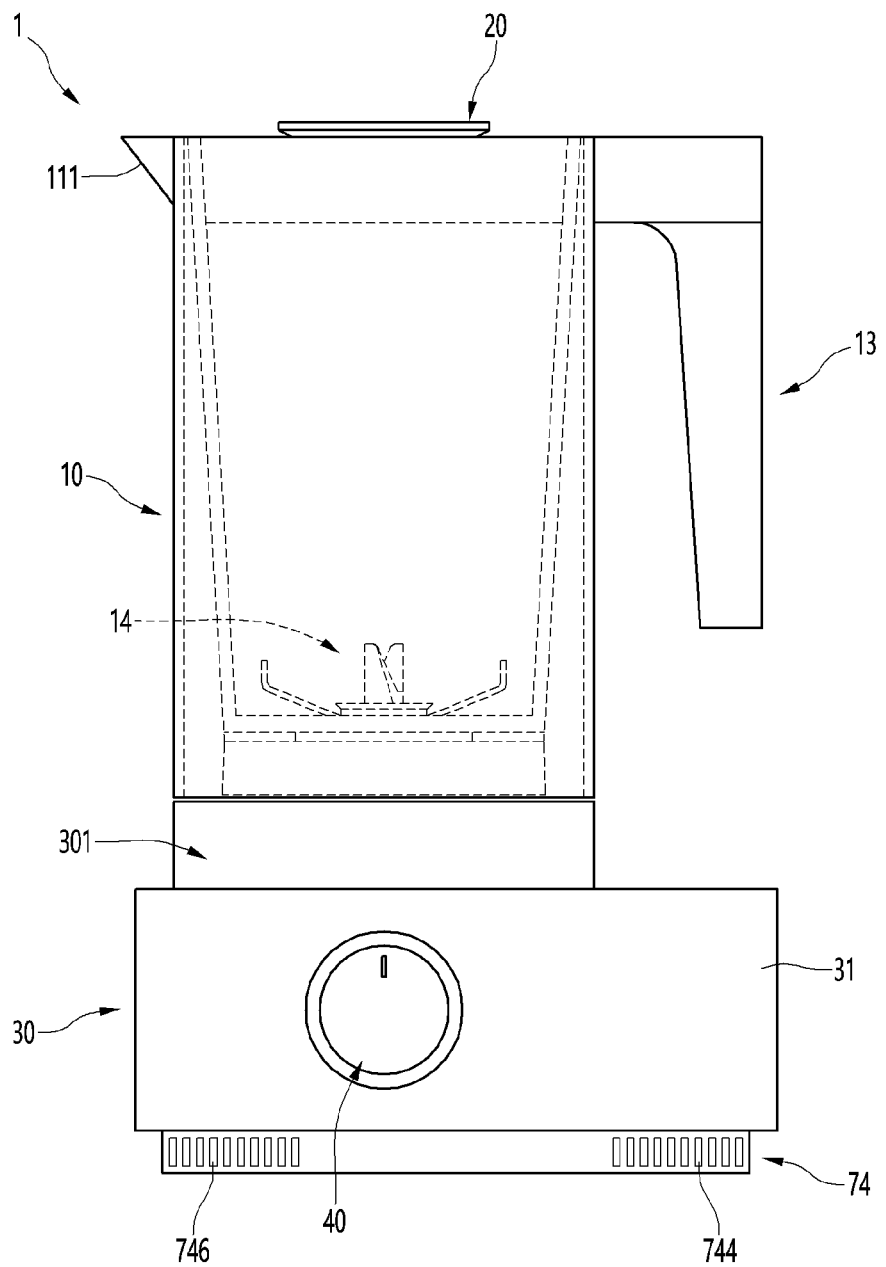
FIG. 1 is a front view of a blender according to an embodiment of the present invention.
Figure 2:
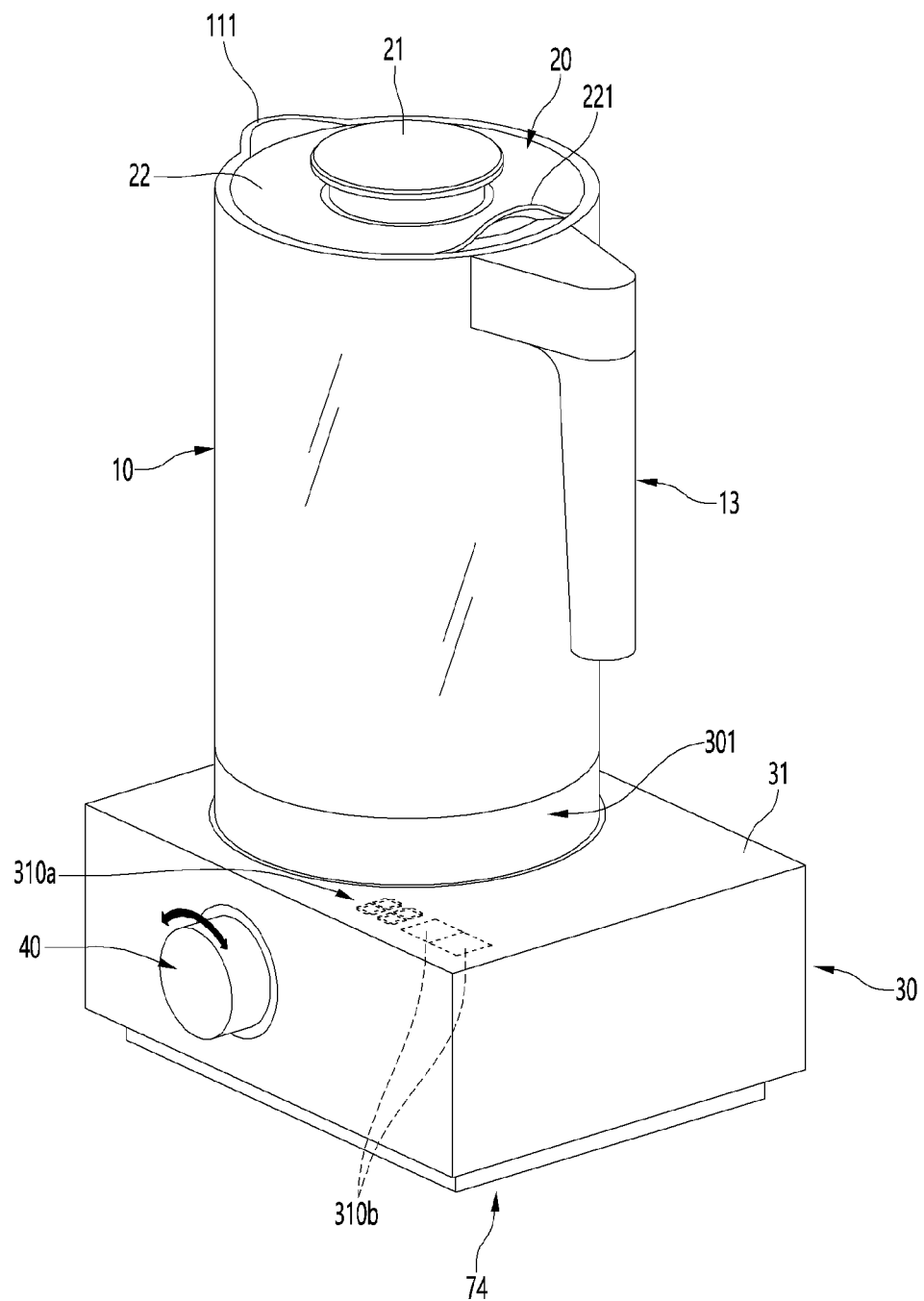
FIG. 2 is a perspective view of the blender.
Figure 3:
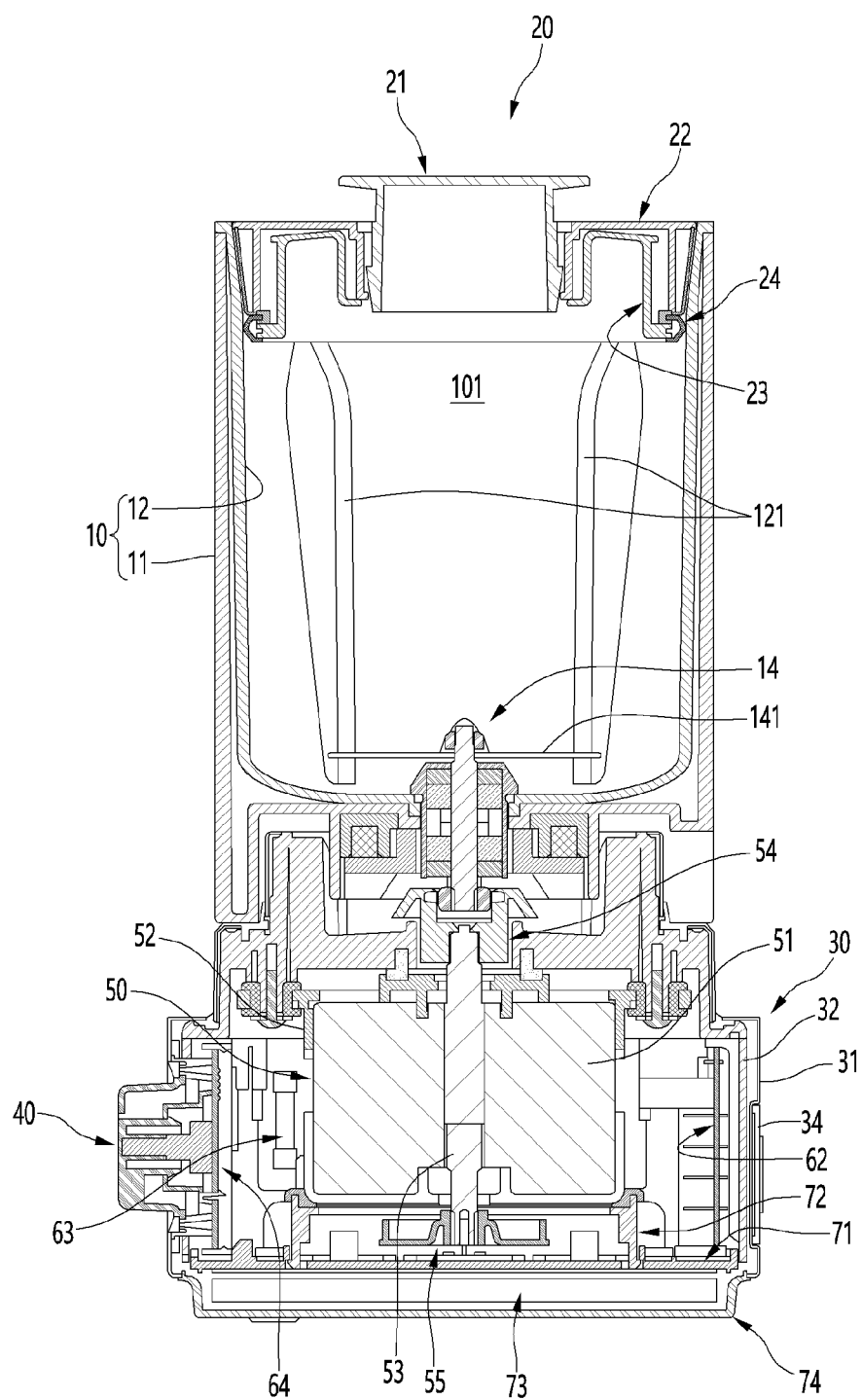
FIG. 3 is a longitudinal cross-sectional view of the blender.

FIG. 1 is a front view of a blender according to an embodiment of the present invention. FIG. 2 is a perspective view of the blender. FIG. 3 is a longitudinal cross-sectional view of the blender.

For the convenience of explanation and understanding, directions are defined first. A position at which a knob 40 is disposed is referred to as a front surface or a front side, and a portion to which a power connector (reference numeral 35 in FIG. 10) is connected is defined as a rear surface or a rear side. In addition, a position of the bottom of the body 30 may be referred to as a bottom surface or a lower side, and a position of an upper end of a container 10 may be referred to as a top surface or an upper side. In addition, a left side with respect to the knob 40 may be referred to as a left surface or a left direction, and a right side with respect to the knob 40 may be defined as a right surface or a right direction.

As illustrated in the drawings, a blender 1 according to an embodiment of the present invention may include a body 30 disposed on a bottom surface, and a container 10 seated on an upper portion of the body 30.

In the body 30, electrical devices and components including a motor assembly 50 and a printed circuit board (PCB) module 60 for an operation of the blender 1 may be disposed. In addition, manipulation portions 40 and 310*b* for manipulating the operation of the blender 1 and a display portion 310*a* for displaying the operation may be provided.

The body 30 may have a hexahedral shape as a whole, and a container seating portion 301 for seating the container 10 thereon may be provided on a top surface of the body 30. The container seating portion 301 may be configured so that the container 10 is detachable in a vertical direction.

An outer appearance of the body 30 may be defined by an outer case 31 made of a metal material or having a metal texture, and the outer case 31 may have a hexahedral shape with an opened bottom surface. In addition, an inner case 32 may be provided inside the outer case 31, and a space in which the motor assembly 50 and the PCB module 60 are mounted may be provided inside the inner case 32.

The knob 40 for setting the operation of the blender 1 by a user may be provided on the front surface of the body 30. The knob 40 may protrude from the front surface of the body 30 and may be manipulated to set the operation of the blender 1 by rotation thereof.

A bottom cover 74 may be provided on the bottom surface of the body 30. The bottom cover 74 may be coupled to the outer case 31 and the inner case 32 and may be disposed to be in contact with the bottom surface on which the blender 1 is installed. In addition, the bottom cover 74 may allow the outer case 31 and the inner case 32 to be spaced apart from the bottom surface, and a cover suction hole 744 and a cover discharge hole 746, through which cooling air is suctioned into and discharged from the body 30, may be defined in the bottom cover 74.

A display portion 310*a* for visualizing an operation state of the blender 1 may be provided on the top surface of the body 30. For example, the display portion 310*a* may be provided in the form of at least one seven-segment display. In addition, a touch manipulation portion 310*b* capable of manipulating start or stop of the operation of the blender 1 may be provided on the top surface of the body 30. For manipulating the blender 1, the manipulation portions 40 and 310*b* may include at least one of the knob 40 or the touch module 65.

In addition, the container seating portion 301 may be provided on the top surface of the body 30. The container seating portion 301 may protrude from the top surface of the body 30, and a portion of the container seating portion 301 may be inserted into a bottom surface of the container 10 to stably support the container 10. When the container 10 is seated on the container seating portion 301, the motor assembly 50 and the blade module 14 inside the container 10 may be coupled to each other to transmit rotational force to the blade module 14.

The container seating portion 301 may be disposed at one side that is slightly biased from a center of the body 30. A total horizontal length including a handle 13 of the container 10 and a horizontal length of the body 30 correspond to each other. Thus, a center of a food accommodation space of the container 10 may be disposed to be eccentric from a center of the body 30, and a center of the container seating portion 301 may also be disposed in the same extension line as the center of the container 10. In addition, the knob 40 may be disposed at a position corresponding to the center line of the container seating portion 301 and the container 10 and may be disposed at an eccentric side of the front surface of the body 30.

The container seating portion 301 may also be made of the same material as the outer case 31. The container seating portion 301 may be made of a metal material or a material having a metal texture to have a sense of unity with the outer appearance of the body as a whole.

The motor assembly 50 may be mounted inside the body 30 below the container seating portion 301. The motor assembly 50 may be provided for rotation of the blade module 14 inside the container 10 and may rotate at a high speed. In addition, the rotational speed of the motor assembly 50 may be adjusted according to the manipulation of the knob 40.

An upper end of the motor assembly 50 may be connected to the blade module 14 inside the container 10. In addition, a cooling fan 55 may be provided at a lower end of the motor assembly 50, and when the motor assembly 50 is driven, the cooling fan 55 may rotate at the same time with the blade module 14 to force a flow of cooling air inside the body 30.

A plurality of PCB modules 60 may be disposed on an inner wall surface of the inner case 32 defining an inner surface of the body 30. The PCB module 60 may be provided in plurality and may be disposed around the inner surface of the body 30, that is, on front and rear surfaces and both left and right surfaces, respectively.

In addition, an opened bottom surface of the inner case 32 may be shielded by a base plate 71. In addition, the base plate 71 may be provided with an air guide 72 for guiding the discharge of the cooling air suctioned by the cooling fan 55.

A predetermined space may be defined between the base plate 71 and the bottom cover 74, and a wireless power module 73 may be provided between the base plate 71 and the bottom cover 74. The wireless power module 73 may supply power to the motor assembly 50 in a wireless manner using induced electromotive force.

The container 10 may be provided in a cylindrical shape corresponding to an outer diameter of the container seating portion 301, and a top surface of the container 10 may be opened to access the food accommodation space therein. The container 10 may be made of glass or a material capable of allowing visual recognition inside the container.

The container 10 may be provided with a blade module 14 at a center of the inner bottom surface. The blade module 14 includes a plurality of blades 141 and may be connected to the motor assembly 50. Thus, when the motor assembly 50 is driven while the container 10 is seated on the body 30, the blades 141 may rotate to crush or cut the food inside the container 10.

In addition, a plurality of inner guides 121 for guiding the rotating food may be provided inside the container 10. Each of the inner guides 121 may extend upward by a predetermined length from a lower end of the inner surface of the container 10 and may extend to a bottom surface of a lid 20 when the lid 20 is mounted.

A spout 111 for pouring the crushed food may protrude from an upper end of the container 10, and a handle 13 may protrude from one side facing the spout 111. The handle 13 may protrude outward from the upper end of the container 10 and extend downward so that the user may lift or move the container 10. The protruding end of the handle 13 may be disposed in the same extension line as a side end of the body 30.

In addition, the lid 20 may be mounted on the opened top surface of the container 10. The lid 20 may shield the opened top surface of the container 10, and the user may hold the lid handle 13 and separate the lid 20 from the container 10 to open or close the opened top surface of the container 10. The lid 20 may include a lid upper portion 22, a lid lower portion 23, and the lid handle 21, and a lid gasket 24 may be provided along a circumference of the lid 20.

Hereinafter, a structure of the container 10 will be described in more detail with reference to the drawings.

Figure 4:
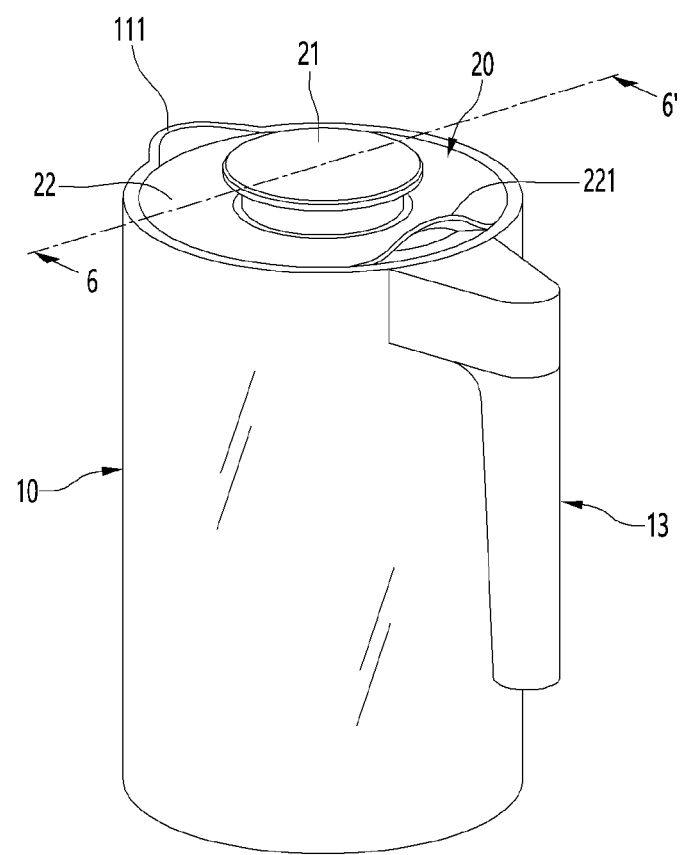
FIG. 4 is a perspective view of the container that is one component of the blender.
Figure 5:
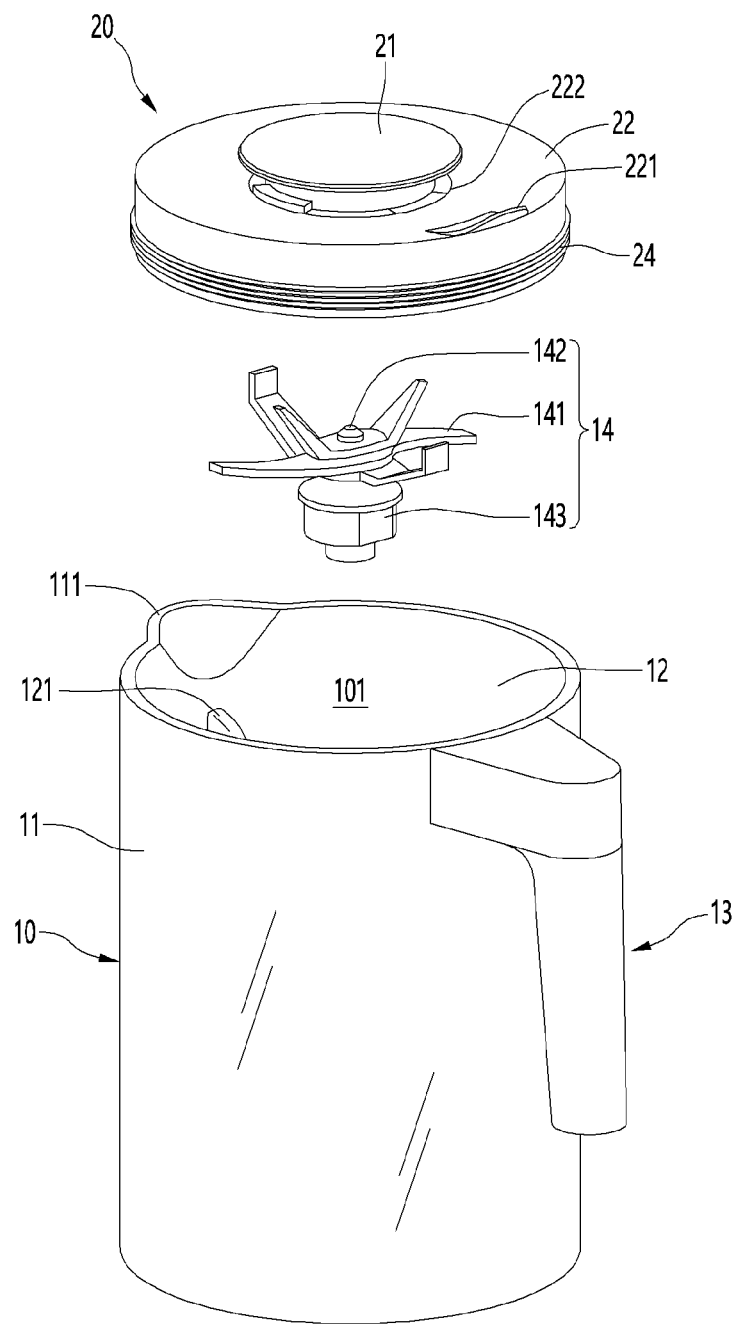
FIG. 5 is an exploded perspective view of the container.
Figure 6:
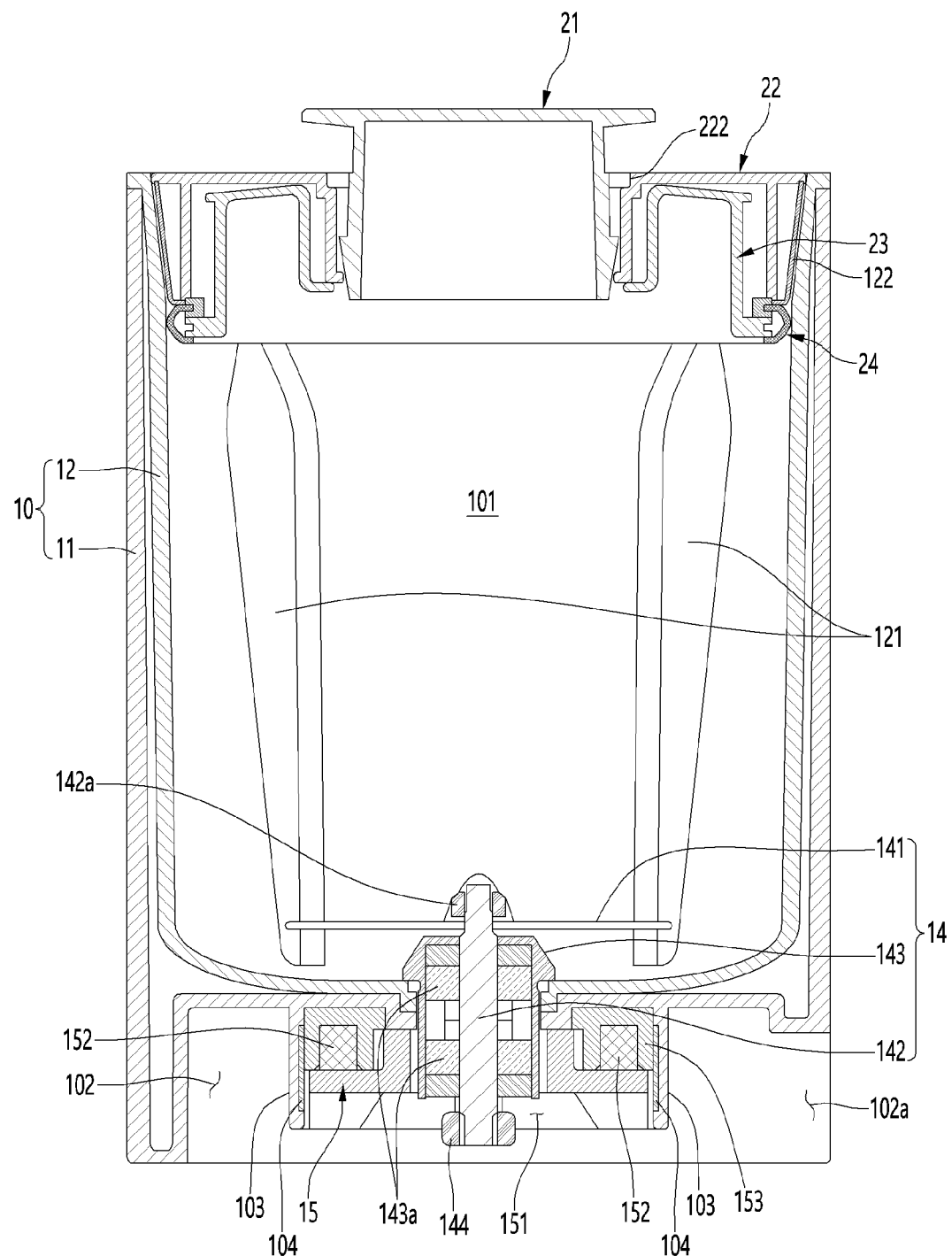
FIG. 6 is a cross-sectional view taken along line 6-6' of FIG. 4.
Figure 7:
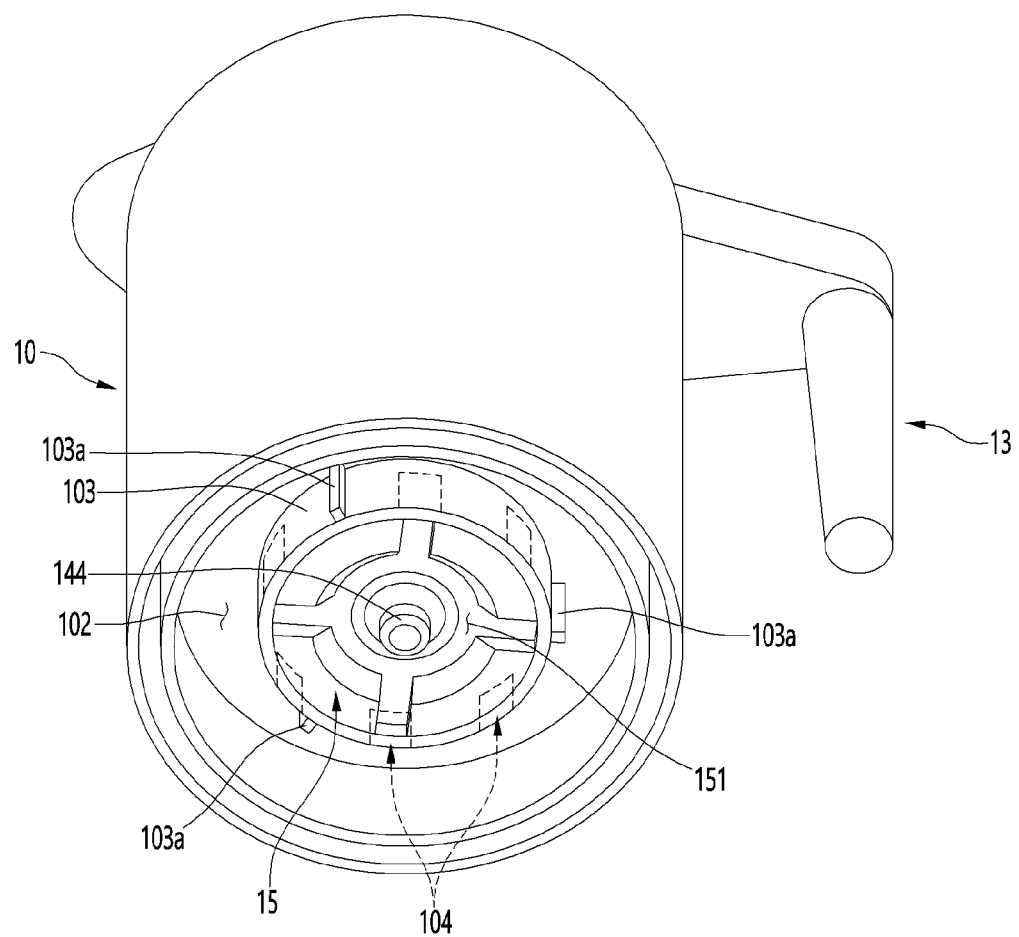
FIG. 7 is a perspective view of the container when viewed from below.

FIG. 4 is a perspective view of the container that is one component of the blender. FIG. 5 is an exploded perspective view of the container. FIG. 6 is a cross-sectional view taken along line 6-6' of FIG. 4. FIG. 7 is a perspective view of the container when viewed from below.

As illustrated in the drawings, the container 10 is provided in a cylindrical shape with an opened top surface. In addition, the blade module 14 may be mounted on the bottom surface of the container 10, and the lid 20 may be detachably mounted on the opened top surface of the container 10.

The container 10 may be made of a material such as glass, tritan, transparent plastic, etc. so that the state of the food therein can be checked during the operation of the blender 1. In addition, the container 10 may include an outer container 11 defining an outer shape, and an inner container 12 defining an inner space in which food is accommodated.

The inner container 10 and the outer container 11 may be coupled to each other to define the overall shape of the container 10, and the container 10 may have a double-wall structure. In addition, the outer container 11 may be provided in a cylindrical shape having the same outer diameter at an upper end and a lower end thereof so that the outer appearance of the container 10 is seen to be neat. In addition, an outer diameter of the outer container 11 may be provided to be the same as an outer diameter of the container seating portion 301, so that the body 30 and the container 10 have a sense of unity when the container 10 is mounted.

In addition, a body accommodation portion 102 may be defined in the bottom surface of the outer container 11. The body accommodation portion 102 defines a space that is recessed upward from the bottom surface of the outer container 11 and defines a space into which a second seating portion 325 to be described below is inserted. The body accommodation portion 102 and the second seating portion 325 may be coupled to each other so that the container 10 is maintained in a state of being mounted on the container seating portion 301.

A vent cutout portion may be provided at one side of a lower end of the outer container 11. The air vent may provide a passage through which air is exhausted between the bottom surface of the container 10 and the top surface of the container seating portion 301 when the container 10 and the container seating portion 301 are coupled to or separated from each other. Thus, the container 10 may be easily mounted on and separated from the container seating portion 301. The air vent may extend upward from the lower end of the outer container 11 and may communicate with an internal space of the body accommodation portion 102.

A container coupling portion 103 on which the blade module 14 is mounted may be provided at a center of the bottom surface of the outer container 11. The container coupling portion 103 may be located at the inner surface of the outer container 11 and the inner center of the body accommodation portion 102. The container coupling portion 103 may protrude downward in a rib shape that extends downward with the center of the bottom surface of the container 10 as a center. In addition, the container coupling portion 103 does not extend further downward than the lower end of the outer container 11, and provides a space in which the blade module 14 is disposed in the center of the container 10. In addition, the inside of the container coupling portion 103 may have a structure in which the container can mate with the inside of the container seating portion 301 when the container is seated on the container seating portion 301.

The inner container 12 may be spaced apart from the outer container 11 to define a space between the outer container 11 and the inner container 12. The inner container 12 may have a diameter that gradually decreases downward. A lower portion of the inner container 12 may be inclined or rounded toward the blade module 14, and may direct the food inside the container 10 toward the blade module 14.

An upper end of the inner container 12 may have an inclined surface 122 of which an inner diameter is narrowed downward. Therefore, in the process of inserting the lid 20 into the opened top surface of the container 10, the lid 20 may have a structure that seals while being gradually in close contact with the inner container 12. The inclined surface of the upper end of the inner container 12 may be provided from the upper end of the container 10 to the upper end of the inner guide 121 and may be disposed along a circumference of the inner surface of the container 10. In addition, the inner guide 121 may be disposed on the inner surface of the inner container 12. The inner guide 121 may extend from the inclined surface 122 to the bottom surface of the inner container 12.

The lid 20 may include a lid upper portion 22 defining a top surface and a lid lower portion 23 coupled to the lid upper portion 22 to define a bottom surface of the lid 20. The lid handle 21 may be inserted and mounted in an opened center of each of the lid upper portion 22 and the lid lower portion 23 and may be provided detachably. Thus, in a state in which the lid handle 21 is separated, food may be added or accessible to the inner space 101 of the container 10.

In addition, a lid gasket 24 that is in contact with the inner surface of the container 10 to seal the inside of the container 10 may be provided around the lid 20. Thus, the lid 20 may be inserted through the opened top surface of the container 10, and the lid gasket 24 may be in contact with the inclined surface 122 of the container while the lid 20 is mounted to maintain the sealing. In addition, the lid gasket 24 may be pressed and be in close contact with the inner surface of the container 10 to prevent the lid 20 from being unintentionally separated from the container 10.

A handle portion 221 may be further disposed on an outer end of the upper lid 22. The handle portion 221 has a shape in which a portion of the upper lid 22 protrudes upward so that the user can hold the handle portion 221 by hand and may be spaced apart from the lower lid 23 to provide a space for a finger to be inserted. Thus, when the lid handle 21 is not used, or the lid handle 21 is separated, the user may easily separate the lid 20 by holding the handle portion 221.

The blade module 14 may be provided at the center of the bottom surface of the container 10. The blade module 14 may be configured to crush the food accommodated in the inner space 101 of the container 10 and may include a plurality of blades 141, a blade shaft 142, and a shaft mounting member 143.

The plurality of blades 141 may extend in different directions. Here, the plurality of blades may be combined with each other, and also, the plurality of blades may be disposed radially with respect to the blade shaft 142 as an axis. The blades 141 may be disposed to be symmetrical about the blade shaft 142, and extending directions, bent angles, and shapes of the plurality of blades 141 may be provided differently. That is, the blades 141 having various shapes may be combined and configured so as to be suitable for crushing and cutting various foods and making food into powder or liquid-like state.

The blade shaft 142 may be mounted to pass through the shaft mounting member 143 and may be supported by a bearing 143a constituting the shaft mounting member 143. A plurality of the bearings 143a may be disposed in the vertical direction and may support the blade shaft 142 to rotate stably. In addition, the shaft mounting member 143 may be firmly fixed through the bottom surface of the container 10.

A blade restriction member 142a is coupled to an upper end of the blade shaft 142 to prevent separation of the blade 141 and to maintain the blade 141 in a state of being fixed to the blade shaft 142.

In addition, a blade-side connection portion 144 may be disposed at a lower end of the blade shaft 142. The blade-side connection portion 144 may be exposed at the center of the bottom surface of the container 10 to protrude downward. Thus, when the container 10 is mounted on the container seating portion 301, the blade-side connection portion 144 may be connected to a motor-side connection portion 54 to be described below so that the power of the motor assembly 50 is transmitted.

The container coupling portion 103 may be defined on the bottom surface of the container 10, and a mounting cover 15 may be provided inside the container coupling portion 103. The mounting cover 15 defines an accommodation space 151 in which the motor-side connection portion 54 may be accommodated when the container 10 is mounted on the container seating portion 301.

That is, the center of the mounting cover 15 may be opened to allow the shaft mounting member 143 to pass therethrough, and the blade-side connection portion 144 may be exposed through the center of the bottom surface of the mounting cover 15. In addition, the central portion of the mounting cover 15 corresponding to the circumference of the blade-side connecting portion 144 is recessed so that the motor-side connecting portion 54 may be accommodated.

Thus, in the process in which the container 10 is seated on the container seating portion 301, the motor-side connection portion 54 and the blade-side connection portion 144 have a structure that can be naturally coupled to each other without interfering with each other.

A mounting case 153 and an elastic member 152 may be further provided inside the container coupling portion 103. The mounting case 153 is fixedly mounted inside the container coupling portion 103, and is formed so that the ring-shaped elastic member 152 may be disposed inside the mounting case 153. In addition, the elastic member 152 may be supported by the mounting cover 15. Thus, the impact applied to the mounting cover 15 while the container is mounted on the container seating portion 301 may be buffered by the elastic member 152.

The container coupling portion 103 may be provided with a detection member 104. The detection member 104 may be configured to transmit information on whether the container 10 is mounted and information on the container 10 to the detection device 39 of the body 30.

That is, when the container 10 is mounted on the container mounting portion 301, a detection device 39 on the body 30 may detect the detection member 104 to detect the mounting of the container 10, may also identify the type of the container 10.

In detail, a plurality of the detection members 104 may be disposed along the circumference of the container coupling portion 103. The detection members 104 may be arranged at equal intervals, and the container 10 may be disposed to be positioned at a position facing the detection device 39 in a state in which the container 10 is mounted on the container seating portion 301. For example, six detection members 104 may be provided, and may be positioned at positions separated by an angle of 60° with respect to the center of the container 10.

Thus, the detection device 39 may recognize the detection member 104 at any position regardless of the mounting direction of the container 10. The arrangement of the detection device 39 and the relationship with the detection member 104 will be described in detail below.

The detection member 104 may have various configurations recognizable by the detection device 39. For example, the detection member 104 may be a magnet, and the detection device 39 may be a Hall sensor that detects a magnet. Thus, when the detection member 104 and the detection device 39 are disposed to face each other, the Hall sensor may detect the magnet to recognize the mounting of the container 10.

In addition, the detection member 104 may be provided inside the circumference of the container coupling portion 103 and may be disposed so as not to be exposed to the outside. In addition, on the premise that the magnetic force of the detection member 104 can be detected by the detection device 39, the detection member 104 is provided inside the mounting cover 15 or inside the mounting case 153.

A coupling guide 103a protruding outward may be formed on the outer surface of the container coupling portion 103. The coupling guide 103a may extend from the top to the bottom of the container coupling portion 103 and may protrude outward. A plurality of coupling guides 103a may be disposed at regular intervals, and for example, three coupling guides 103a may be disposed at intervals of 120° respectively. The container coupling portion 103 is formed to be inserted into the guide coupling groove 325c to be described below when the container 10 is mounted on the container seating portion 301. Thus, when the container 10 is seated on the container seating portion 301, the container coupling portion 103 may be aligned while being inserted into the guide coupling groove 325c. In addition, due to the arrangement of the container 10, the detection member 104 and the detection device 39 are positioned to face each other, so that the mounting of the container 10 may be detected.

In addition, a plurality of the detection members 104 are provided, and the number of the detection members 104 may be different according to the type of the container 10. In this case, a plurality of the detection devices 39 may also be provided to determine the type of the container 10 based on the number of the detection members 104 to be detected.

For example, the container 10 may be a container 10 of the blender 1 for crushing general food. Therefore, when the detection device 39 detects the mounting of the container 10, the detection device 39 may recognize the type of the container 10, and may set a basic value to an operation suitable for the container 10. In such a state, the blender 1 may be operated by the suitable operation of use.

In addition, another container 10' for accommodating and crushing food having a different purpose from that of the container 10 or for processing in the another container 10' may be used in a state of being seated on the container seating portion 301. For example, another container 10' may be a rice polishing machine capable of peeling or shaving grains such as rice.

Hereinafter, another container according to an embodiment of the present invention will be described in more detail with reference to the drawings.

Figure 8:
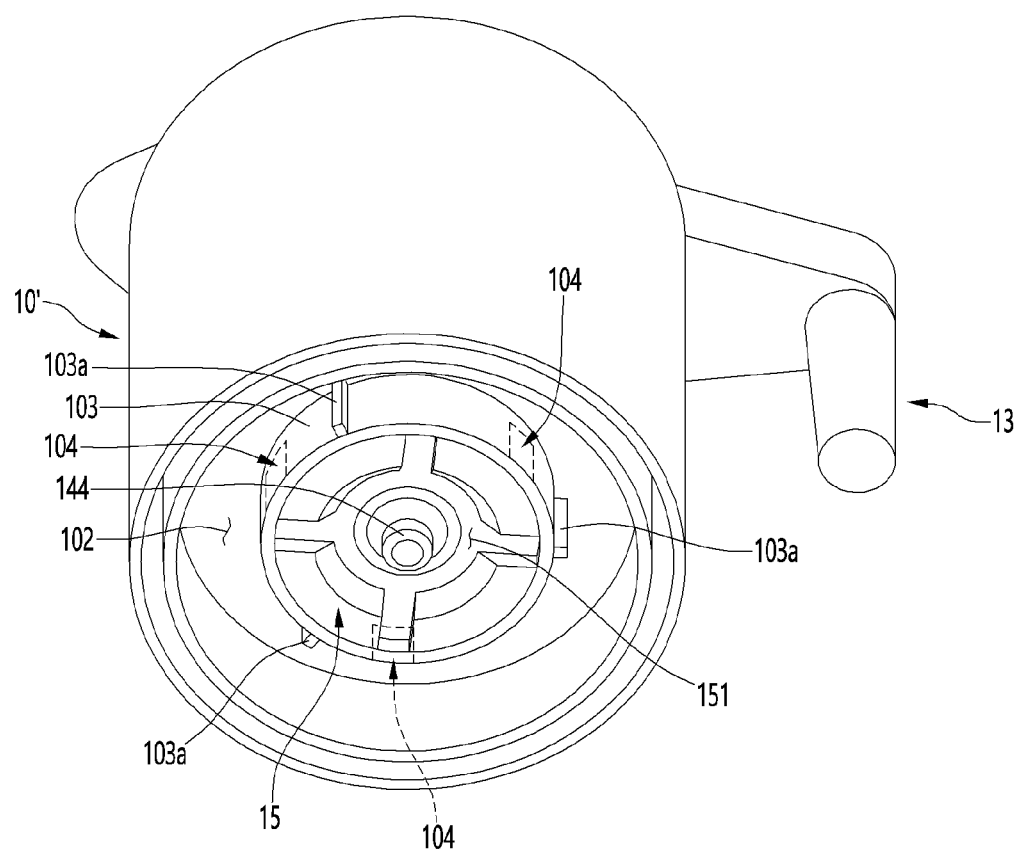
FIG. 8 is a perspective view of another container according to an embodiment of the present invention when viewed from below.

FIG. 8 is a perspective view of another container according to an embodiment of the present invention when viewed from below.

As illustrated, the whole structure and shape of the other container 10' according to the present embodiment may be configured to be the same as the above-described container 10, and the same configuration will be described using the same reference numerals. In addition, the other container 10' may be referred to as a container or second container for rice polishing, and the container may be referred to as a container for a blender or a first container.

The other container 10' has a slightly lower height than the container 10, and the overall external shape may be the same. Particularly, the other container 10' must be able to be seated on the container seating portion 301 of the blender 1, and the shape of the bottom surface of the container 10' is formed to correspond to the inner shape of the container seating portion 301.

A container coupling portion 103 may be formed on a bottom surface of the other container 10'. The container coupling portion 103 inserted into the inside of the container seating portion 301 may be formed. In addition, a mounting cover 15 may be provided inside the container coupling portion 103. The mounting cover 15 defines an accommodation space 151 in which the motor-side connection portion 54 may be accommodated when the container 10 is mounted on the container seating portion A blade-side connection portion 144 may be exposed to the center of the mounting cover 15. In addition, the central portion of the mounting cover 15 corresponding to the circumference of the blade-side connecting portion 144 is recessed so that the motor-side connecting portion 54 may be accommodated.

In addition, the coupling guide 103a protruding outward may be formed around the container coupling portion 103. When the other container 10' is seated on the container seating portion 301, the coupling guide 103a is inserted into the guide coupling groove 325c, and the other container 10' is inserted into the container seating portion 301 and installed in an aligned state.

The detection member 104 may be provided along the circumference of the container coupling portion 103. The detection member 104 may be, for example, a magnet. A plurality of the detection members 104 may be arranged at regular intervals along the circumference of the container coupling portion 103. For example, three detection members 104 may be provided, and may be disposed at intervals of 120° with respect to the center of the other container 10'.

Particularly, the number and positions of the detection members 104 are arranged differently from the detection members 104 of the container 10 described above. Thus, the detection device 39 may detect the detection member 104 to determine whether the other container 10' is mounted, and may also identify the other mounted container 10'.

Thus, when the user places the other container 10' on the container seating portion, the controller of the blender 1 recognizes the other container 10' and sets an operation suitable for the other container 10' as a basic operation. In such a state, the user may manipulate the manipulation portions 40 and 310b to perform an operation suitable for the other container 10'.

Of course, as with the other container 10', various containers that require the blade module 14 to be rotated may be used in addition to the rice polishing machine. Each of these containers may be provided with the detection member 104 at a different location to distinguish them by the detection device 39.

Hereinafter, the structure of the body 30 will be described in detail with reference to the drawings.

Figure 9:
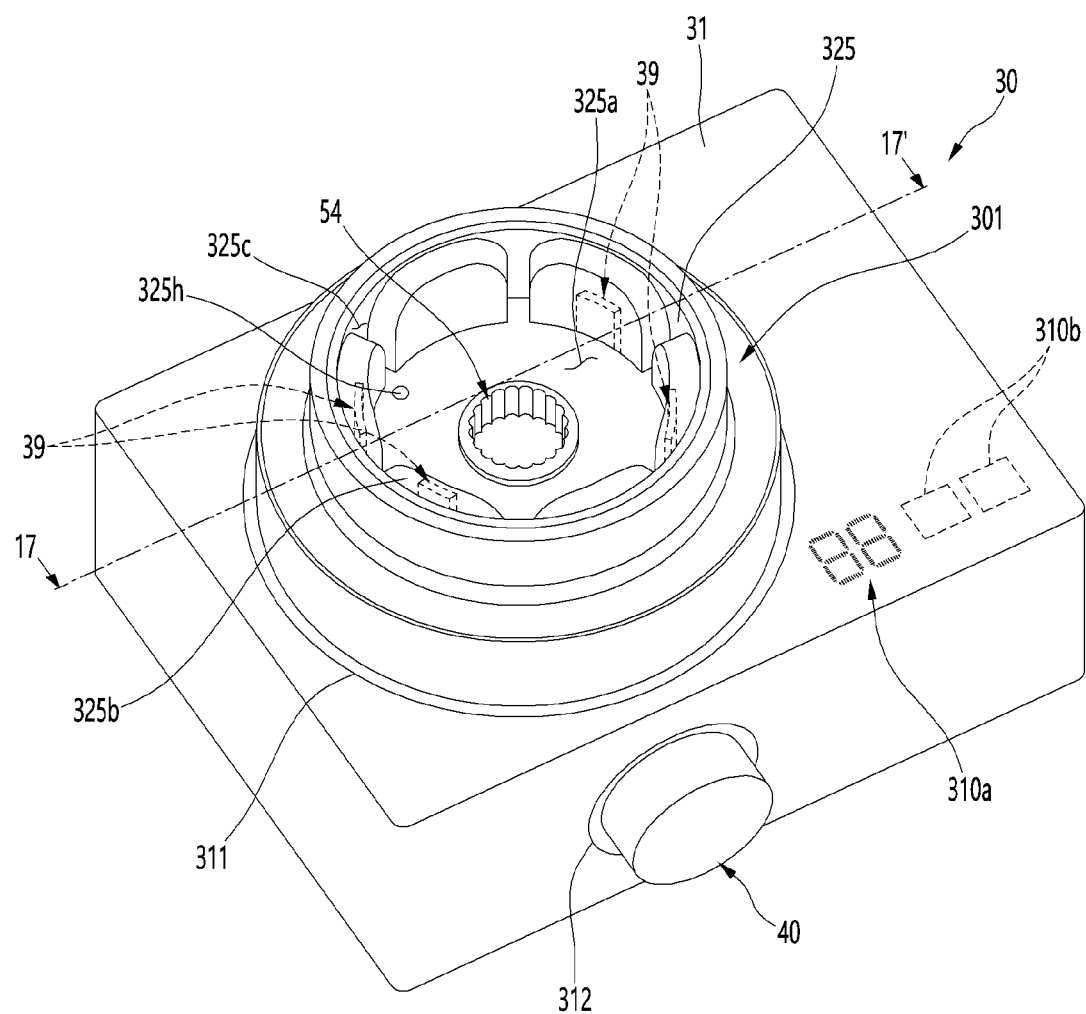
FIG. 9 is a perspective view of a body that is one component of the blender.
Figure 10:
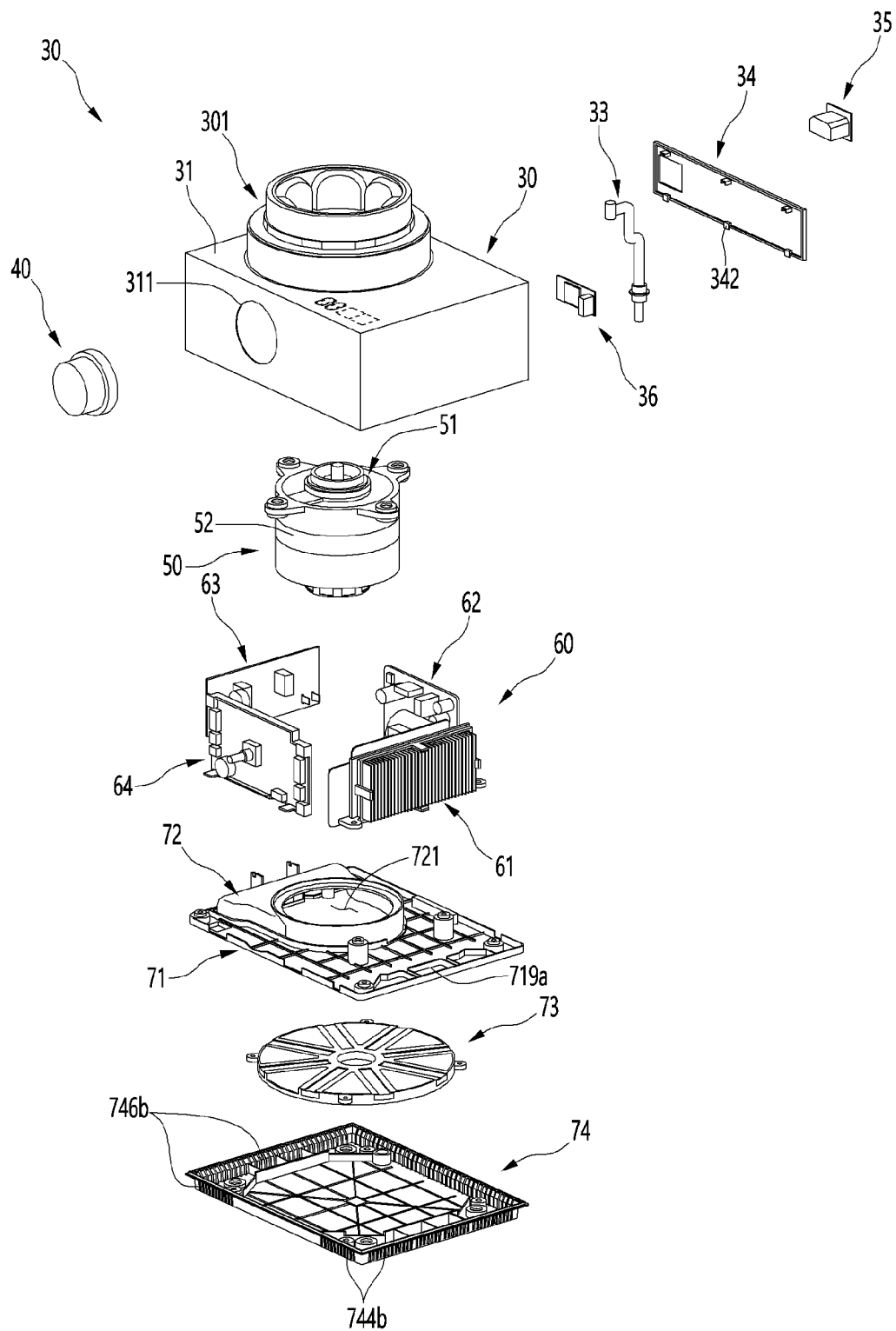
FIG. 10 is an exploded perspective view of the body when viewed from above.
Figure 11:
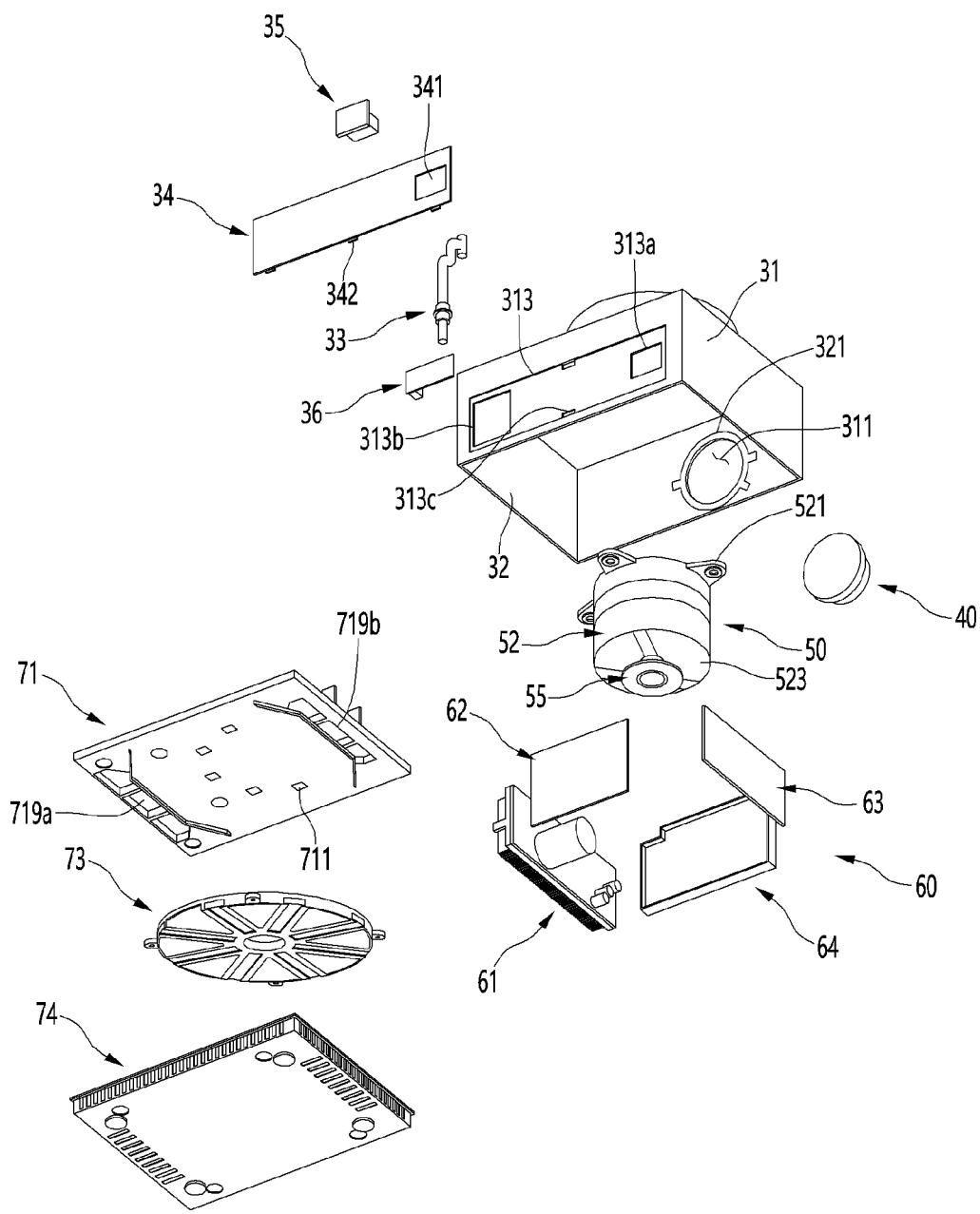
FIG. 11 is an exploded perspective view of the body when viewed from below.
Figure 12:
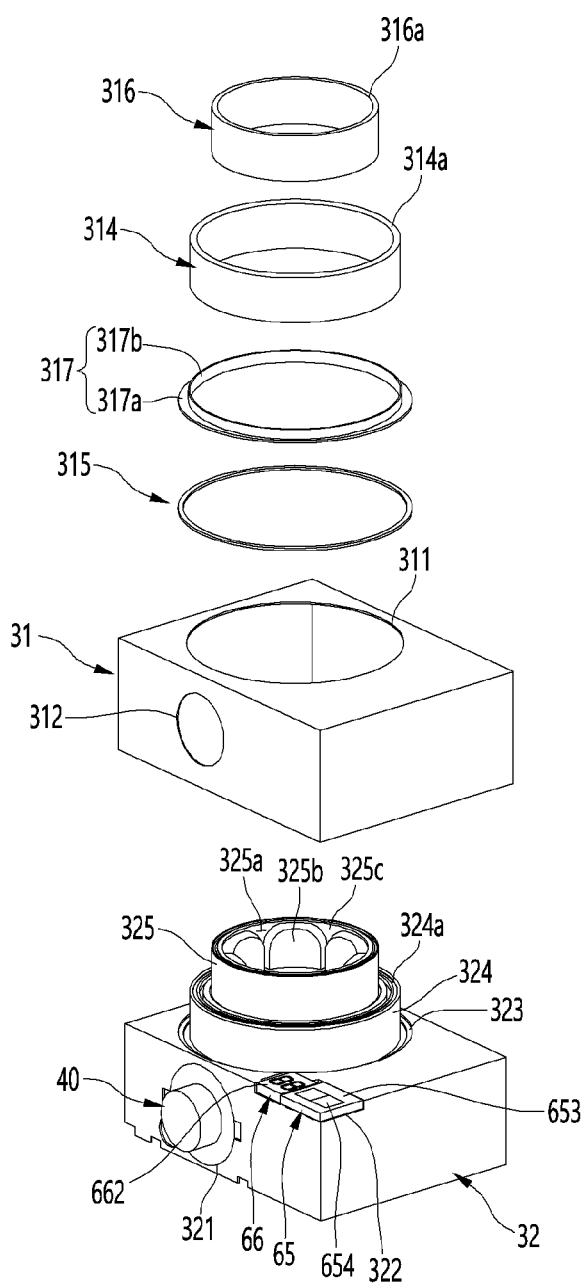
FIG. 12 is an exploded perspective view illustrating a coupling structure of components defining an outer appearance of the body.
Figure 13:
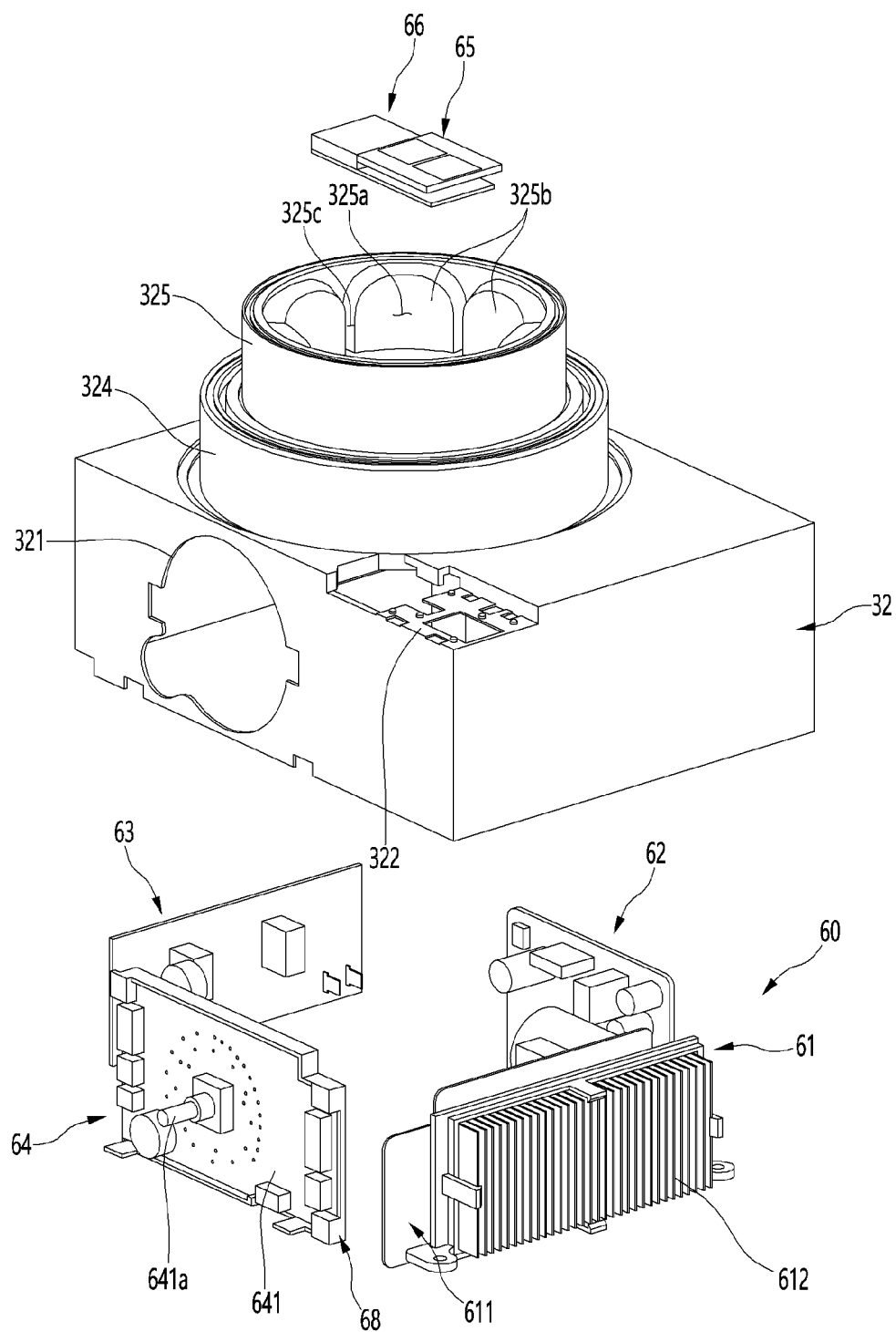
FIG. 13 is an exploded perspective view illustrating an arrangement relationship between an inner case, which is one component of the body, and PCB modules.

FIG. 9 is a perspective view of a body that is one component of the blender. FIG. 10 is an exploded perspective view of the body when viewed from above. FIG. 11 is an exploded perspective view of the body when viewed from below. FIG. 12 is an exploded perspective view illustrating a coupling structure of components defining an outer appearance of the body. FIG. 13 is an exploded perspective view illustrating an arrangement relationship between an inner case, which is one component of the body, and PCB modules.

As illustrated in the drawings, the body 30 may be formed in a rectangular parallelepiped box shape. In addition, a container seating portion 301 for mounting the container 10 may be formed to protrude on the top surface of the body 30, and a knob 40 for manipulating the operation of the blender 1 may be disposed on the front surface of the body 30.

The inner and overall structure of the body 30 may be defined by the inner case 32, and the outer case 31 may be mounted on the outside of the inner case 32 to define the outer appearance of the body 30. The inner case 32 may be an injected plastic material that provides a structure in which the internal and external components of the body 30 are mounted. In addition, the outer case 31 may be made of a metal material such as stainless steel, and a plate-shaped material may be bent and bonded to provide a very clean and solid appearance.

Each of the outer case 31 and the inner case 32 may have an open bottom surface, and the motor assembly 50 and the plurality of PCB modules 60 may be disposed inside the outer case 31 and the inner case 32. In addition, the opened bottom surface of the inner case 32 may be shielded by the base plate 71, and the bottom surface of the body 30 may be defined by the bottom cover 74.

Referring to the structure of the body 30 in more detail, the outer case 31 may include a rectangular top surface, and front and rear surfaces and left and right surfaces, which extend downward along a circumference of the top surface.

A top surface opening 311 may be defined in a top surface of the outer case 31. The top surface opening 311 may have a diameter equal to or slightly greater than an outer diameter of the container seating portion 301. Thus, when the inner case 32 and the outer case 31 are coupled to each other, the upper portion of the inner case 32 defining the container seating portion 301 may pass through the top surface opening 311 and then be exposed to the outer case 31.

A first seating portion decor 314, a second seating portion decor 316, a lower decor 315, and a connection decor 317 may be mounted on an upper portion of the inner case 32 protruding to the outside of the outer case 31. An overall outer appearance of the container seating portion 301 may be defined by the first seating portion decor 314, the second seating portion decor 316, the lower decor 315, and the connection decor 317. The first seating portion decor 314 and the second seating portion decor 316 may be made of the same material as the outer case 31 or a material having the same texture as the outer case 31.

Each of the first seating portion decor 314 and the second seating portion decor 316 may be provided in a ring shape having a predetermined height. The first seating portion decor 314 may have a diameter greater than that of the second seating portion decor 316, and the connection decor 317 may be provided in a ring shape that connects an upper end of the first seating portion decor 314 to the second seating portion decor 316.

In addition, the first seating portion decor 314, the second seating portion decor 316, and the connection decor 317 may be mounted on outer surfaces of a first seating portion 324 and a second seating portion 325, which are disposed on the inner case 32, and a top surface of the first seating portion 324, respectively.

A lower decor mounting portion 323 may be disposed on the top surface of the inner case 32 that is in contact with a lower end of the first seating portion 324. The lower decor mounting portion 323 may be disposed along a circumference of the first seating portion 324 so that the lower decor 315 is mounted thereon.

The lower decor 315 may be made of a plastic or rubber material and may be provided in a ring shape. In addition, when the first seating portion decor 314 is mounted, a space between the first seating portion decor 314 and the outer case 31 may be filled so that a gap is not visible. That is, the gap between a lower end of the second seating portion decor 316 made of a metal material and a circumference of the top surface opening 311 may be sealed to define a portion of the outer appearance.

The second seating portion 325 may be disposed on a top surface of the first seating portion 324. The second seating portion 325 may have an outer diameter less than that of the first seating portion 324. In addition, a connection decor mounting portion may be disposed on the top surface of the first seating portion 324. The connection decor mounting portion 324a may be disposed along a circumference of a lower end of the second seating portion 325 and may be disposed on the top surface of the first seating portion 324.

The connection decor 317 may be mounted on the connection decor mounting portion 324a. The connection decor 317 may connect an upper end of the first seating portion decor 314 to a lower end of the second seating portion decor 316 and may be provided in a ring shape having a predetermined width. That is, the connection decor 317 may define the top surface of the first seating portion 324 and also define an outer appearance between the first seating portion decor 314 and the second seating portion decor 316.

The connection decor 317 may be constituted by a horizontal portion 317a and a vertical portion 317b. The horizontal portion 317a may have a width corresponding to that of the connection decor mounting portion 324a. Also, a lower end of the horizontal portion 317a may protrude downward to be inserted into a groove of the connection decor mounting portion 324a. In addition, a top surface of the horizontal portion 317a may define an outer appearance of the top surface of the first seating portion 324.

The vertical portion 317b may extend vertically upward along an inner end of the horizontal portion 317a. In addition, the vertical portion 317b may cover the lower end of the second seating portion decor 316. Thus, the first seating portion decor 314 and the second seating portion decor 316 may be connected to each other by the connection decor 317.

The second seating portion 325 may extend upward from the top surface of the first seating portion 324, and an insertion space 325a into which the container coupling portion 103 is accommodated may be defined in the second seating portion 325. A coupling support portion 325b and a container coupling groove 325c may be formed on an inner surface of the insertion space 325a.

The coupling support portion 325b may form at least a portion of an inner circumferential surface of the second seating portion 325. In addition, when the container 10 is mounted, the coupling support portion 326b is protruded to support the outer surface of the container coupling portion 103. A plurality of the coupling support portions 325b may be spaced apart from each other, and the guide coupling groove 325c may be formed between the adjacent coupling support portions 325b.

In addition, the top surface of the coupling support portion 325b may be formed to protrude from the center and be inclined or rounded in both directions from the protruding center. Therefore, when the container 10 is mounted, the coupling guide 103a is in contact with the top surface of the coupling support portion 325b and the coupling guide 103a may be guided toward the guide coupling groove 325c.

The guide coupling groove 325c is recessed to the outside so that the coupling guide 103a may be inserted, and may be formed by the coupling support portions 325b disposed on both sides. The container coupling portion 103 may be formed to extend upward from the bottom surface of the insertion space 325a.

Thus, when the container 10 is mounted on the container mounting portion 301, the container coupling portion 103 may be mounted in an aligned state by the guide coupling groove 325c, and the detection member 104 and the detection device 39 may be guided to face each other. In this case, due to the arrangement of the coupling guide 103a and the guide coupling groove 325c, the position of the container 10 is aligned so that the detection device 39 may recognize the detection member 104, no matter what direction the container is mounted.

In addition, the coupling support portion 325b may support the outer surface of the container coupling portion 103 so that the container 10 may maintain a tight mounting state in a state of being mounted on the container seating portion 301. Thus, the container 10 does not fall in the mounted state and stable operation may be ensured.

A knob hole 312 in which the knob 40 is disposed may be defined in the front surface of the outer case 31. The knob 40 may protrude forward from the body 30 through the knob hole 312.

In addition, a plate groove 313 recessed to accommodate the rear plate 34 may be defined in the rear surface of the outer case 31. In addition, a rear opening 313b for more effective transmission of a communication signal of the communication module 36 may be defined in the plate groove 313. In addition, a plate mounting hole 313c in which the rear plate 34 is mounted may be further defined in the plate groove 313. The communication module 36 may be mounted inside the inner case 32 corresponding to the rear opening 313b. In addition, a connector hole 313a in which the power connector 35 for supplying power to the body 30 is mounted may be defined in the plate groove 313.

In addition, a plate opening 341 may be defined in a position of the rear plate 34, which corresponds to the connector hole 313a, and the power connector 35 may be mounted in the plate opening 341.

The inner case 32 may be provided in a box shape with an opened bottom surface, and the seating portion 301 may be disposed on the top surface of the inner case 32. The inner case 32 may be constituted by a top surface having a planar shape as a whole, front and rear surfaces, and left and right surfaces vertically extending downward along a circumference of the top surface. The inner case 32 may be made of a plastic material to be molded to a relatively complex shape and may provide a structure for mounting the motor assembly 50 and the PCB module 60 therein.

A top surface mounting portion 322 may be disposed on the top surface of the inner case 32. The top surface mounting portion 322 may be recessed so that the display module 66 and the touch module 65 are mounted. The top surface mounting portion 322 may be provided to be stepped and be shielded by the outer case 31 in a state in which the display module 66 and the touch module 65 are mounted.

In addition, a display portion 310a provided in a 7-segment shape by a plurality of fine holes may be disposed in the outer case 31 corresponding to the display module 66, and light irradiated from the display module 66 may be transmitted to display operation information of the blender 1 in figures or letters.

In addition, a touch manipulation portion 310b may be disposed on the top surface of the outer case 31 corresponding to the touch module 65 through printing or surface processing. Thus, the user may touch the touch manipulation portions 40 and 310b to input manipulation for the operation of the blender 1.

The motor assembly 50 may be provided in the inner space of the inner case 32. The motor assembly 50 may be configured for the rotation of the blade module 14 and may be disposed below a central portion of the container seating portion 301.

The motor assembly 50 may include a motor 51 including a motor shaft 53 extending in a vertical direction, a motor housing 52 in which the motor 51 is accommodated, a motor-side connection portion 54 provided on an upper end of the motor shaft 53, and a cooling fan 55 provided on a lower end of the motor shaft 53.

A housing mounting portion 521 for fixing and mounting the motor assembly 50 in the inner case 32 may be disposed on the top surface of the motor housing 52. In addition, a motor-side connection portion 54 may be provided at the upper end of the motor shaft 53 to couple to a blade-side connection portion 144 when the container 10 is mounted. The motor-side connection portion 54 may be coupled to the blade-side connection portion 144 to transmit the rotational force of the motor 51. The motor-side connection portion 54 may be exposed through the top surface of the inner case 32 and may be disposed in a center of the insertion space 325a inside the container seating portion 301. Also, the motor-side connection portion 54 is provided in a shape corresponding to the blade-side connection portion 144 so as to be coupled to each other. Thus, the power of the motor 51 may be effectively transmitted to the blade module 14.

A cooling fan 55 for forcing a flow of the cooling air inside the body 30 may be provided on a lower end of the motor shaft 53. Thus, when the motor 51 rotates, the cooling fan 55 may also rotate at the same time as the blade 141 rotates.

The cooling fan 55 may be exposed to the outside of the motor housing 52 and be accommodated inside an air guide 72 to be described below. Thus, when the cooling fan 55 operates, the air passing through the motor housing 52 may be guided to the inside of the air guide 72.

The plurality of PCB modules 60 for the operation of the blender 1 may be provided inside the inner case 32. The PCB modules 60 may be disposed on the inner surfaces of the inner case 32, respectively. The PCB module 60 may be provided in plurality, which are separated from each other according to their functions, and may be arranged in parallel with a wall surface of the inner case 32 at a position adjacent to the inner surface of the inner case 32.

In detail, the PCB module 60 may include a main PCB module 64 on which the knob 40 is mounted to control the overall operation of the blender 1, an inverter PCB module 61 controlling the motor 51, a power PCB module 62 controlling input power, and a filtering PCB module 63 removing noise. Of course, the PCB module 60 may further include an additional PCB module 60, or some PCB modules 60 may be omitted according to functions of the blender 1.

A base plate 71 may be provided on a lower end of the inner case 32. The base plate 71 may shield the opened bottom surface of the inner case 32 and may support some of the inner components of the inner case 32.

In addition, a plate suction hole 719a and a plate discharge hole 719b may be defined in both left and right sides of the base plate 71, respectively. The plate suction hole 719a is defined along one end of the base plate 71 and may provide a passage through which air for cooling is introduced into the inner case 32 when the motor assembly 50 is driven. The plate discharge hole 719b may be defined along the other end of the base plate 71 and provide a passage through which the cooling air inside the inner case 32 is discharged to the outside of the inner case 32.

An air guide 72 may be disposed on the top surface of the base plate 71. The air guide 72 supports the open lower end of the motor assembly 50 and is connected to the plate outlet 719b to guide the discharge of the air cooled by the motor while passing through the motor assembly 50.

The wireless power module 73 may be provided on a bottom surface of the base plate 71. The wireless power module 73 may be configured to supply wireless power to the blender 1 and may receive power using an induced electromotive force method.

A bottom cover 74 may be provided below the base plate 71. The bottom cover 74 may define the bottom surface of the body 30 and may shield the opened bottom surface of the outer case 31. In addition, when the wireless power module 73 is mounted on the base plate 71, the wireless power module 73 may be shielded by the bottom cover 74.

The bottom cover 74 may be provided in a plate shape having a size corresponding to that of the opened bottom surface of the outer case 31, and a circumference of the bottom cover 74 may extend upward to the outer case 31 and then be coupled to the lower end of the outer case 31. In addition, a cover suction hole 744 and a cover discharge hole 746 may be defined in the bottom cover 74, and an inflow of external air and discharge of air radiated from the inside of the body 30 may be performed through the cover suction hole 744 and the cover discharge hole 746.

Hereinafter, the inner case structure and the mounting structure of the detection device will be described in more detail with reference to the drawings.

Figure 14:
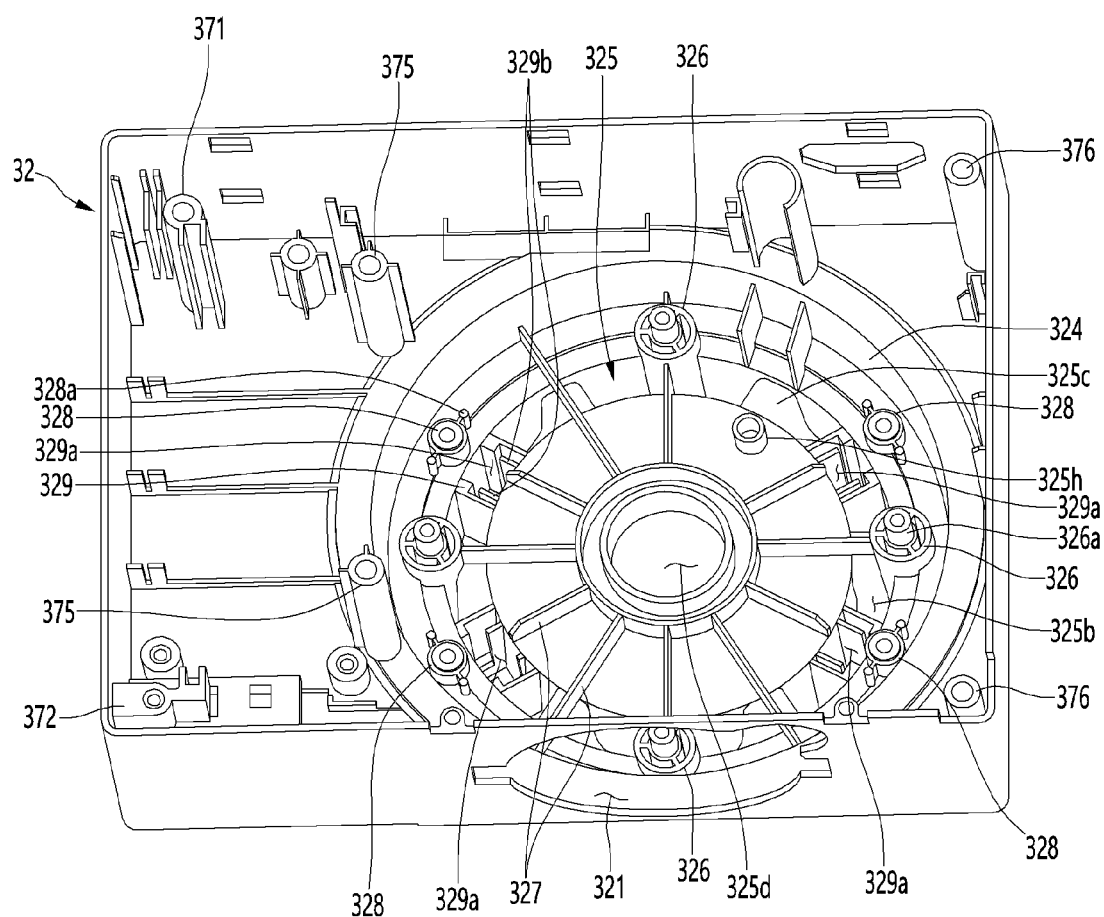
FIG. 14 is a perspective view illustrating the inside of the inner case when viewed in one direction.
Figure 15:
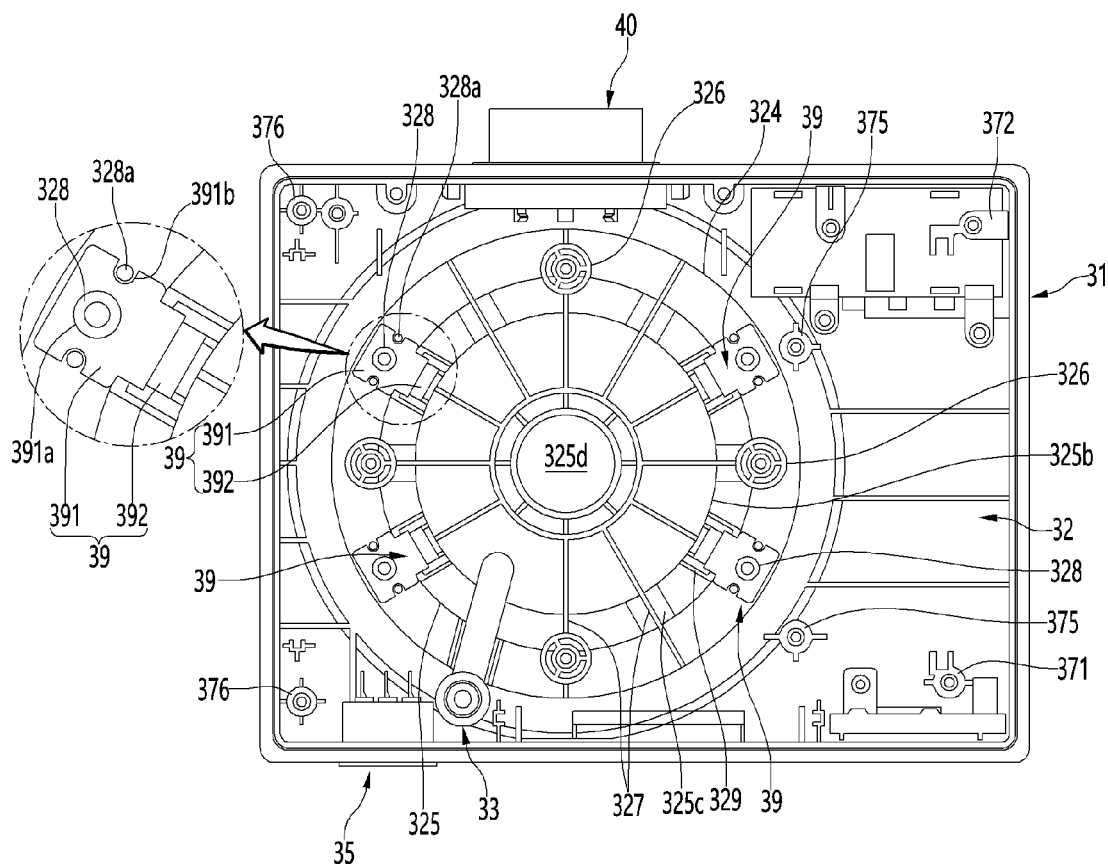
FIG. 15 is a bottom view illustrating a state in which a detection device is mounted inside the inner case.
Figure 16:
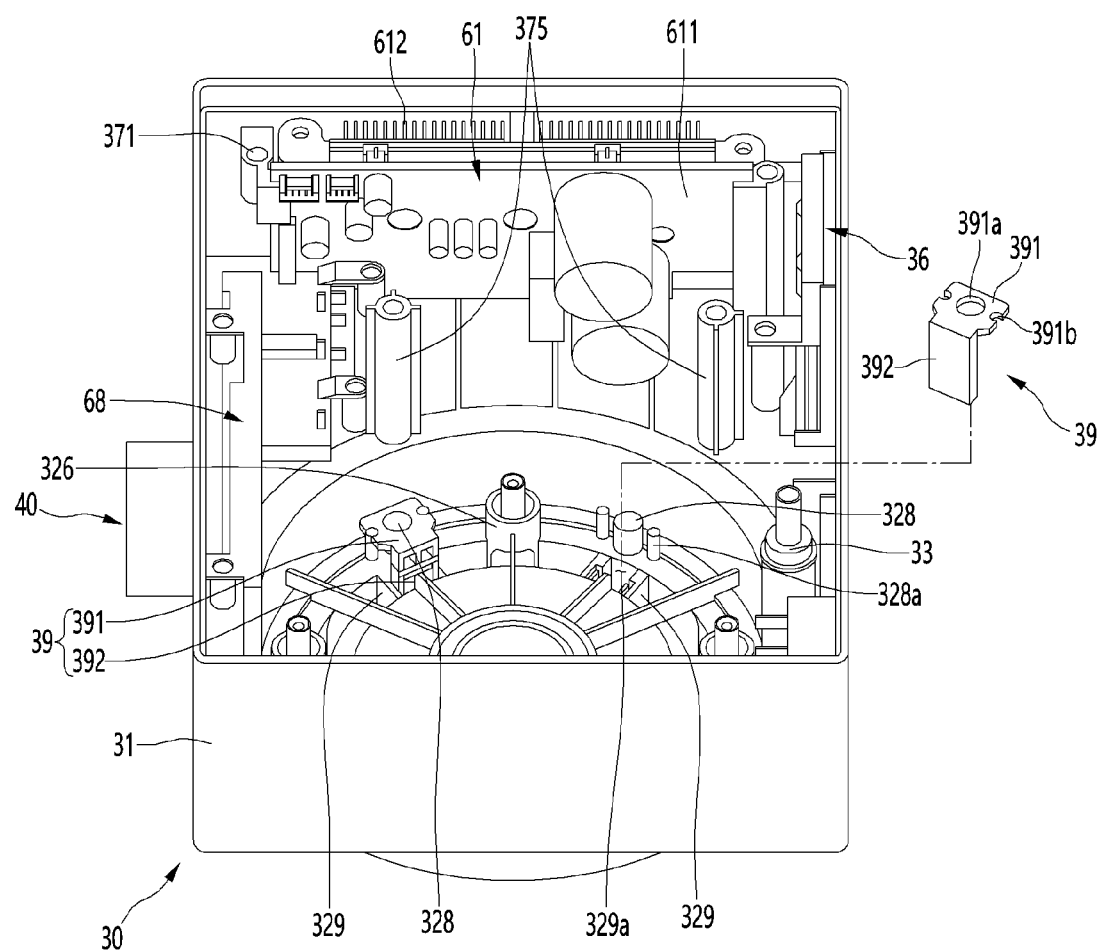
FIG. 16 is an exploded perspective view illustrating a coupling relationship of the detection device.
Figure 17:
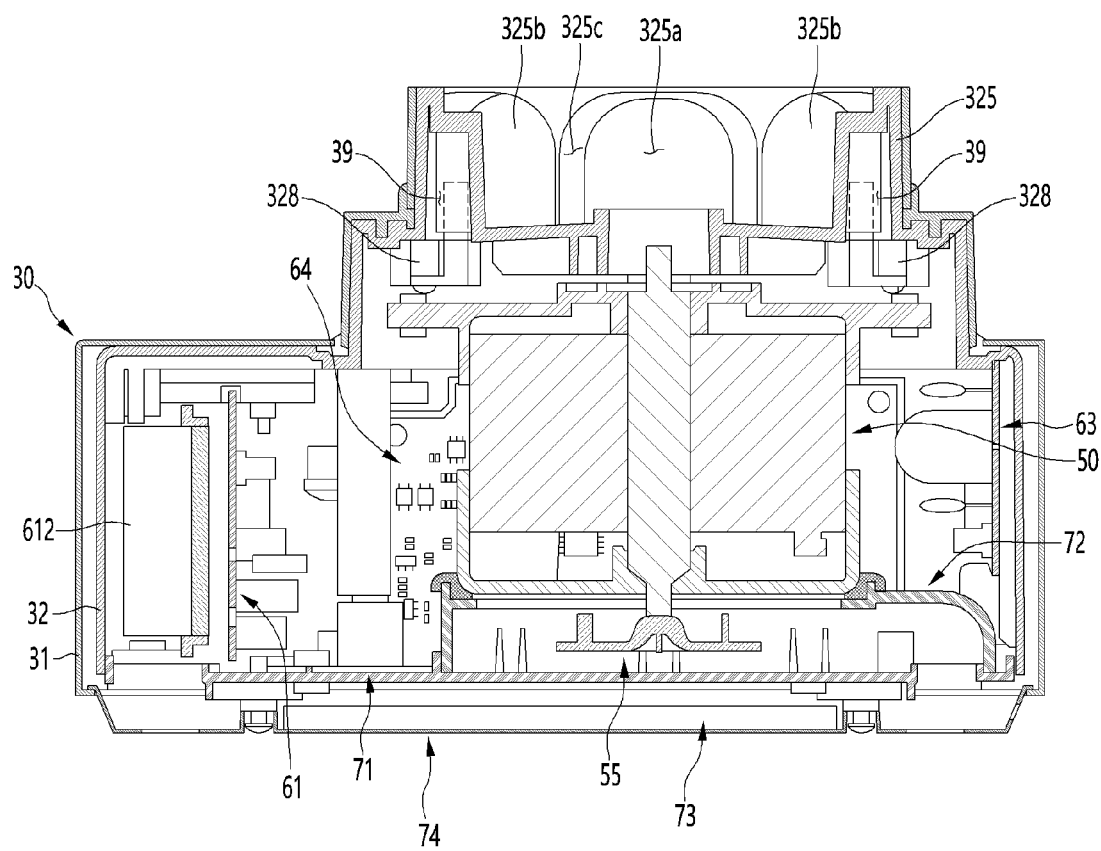
FIG. 17 is a cross-sectional view taken along line 17-17' of FIG. 9.

FIG. 14 is a perspective view illustrating the inside of the inner case when viewed in one direction. FIG. 15 is a bottom view illustrating a state in which a detection device is mounted inside the inner case. FIG. 16 is an exploded perspective view illustrating a coupling relationship of the detection device. FIG. 17 is a cross-sectional view taken along line 17-17' of FIG. 9.

Referring to FIGS. 14 to 17, looking inside the inner case 32, a bottom surface of the inner case 32 may be opened in a rectangular shape.

A plurality of bosses 371, 375, and 376 may be disposed inside the inner case 32 so as to be coupled to the base plate 71. The plurality of bosses 371, 375, and 376 may extend from the top surface of the inside of the inner case 32 toward the opened bottom surface of the inner case 32. In addition, a screw hole through which a screw passing through the base plate 71 is coupled may be defined in each of the bosses 371, 375, and 376. Also, a PCB mounting portion may be disposed on some of the bosses 371, 375, and 376 so that a portion of the PCB module 60 is fixed and mounted.

The base plate 71 may be fixed and coupled to the inner case 32 by the first coupling boss 375, the second coupling boss 376, the third coupling boss 371, and the PCB fixing protrusion 381, and the components inside the body 30 may be maintained in the mounted state.

In addition, an inner top surface of the inner case 32 may be recessed in a shape corresponding to the container seating portion 301. In addition, a seating portion hole 325d passing through the inner case 32 may be defined at a center of the insertion space 325a inside the container seating portion 301. The motor-side connection portion 54 may be mounted in the container seating portion hole 325d. In addition, a drain hole 325h may be defined in a bottom surface of the insertion space 325a. A drain pipe may be connected to the drain hole 325h. Drain pipe guides in which the drain pipe 33 are accommodated may be further provided inside the inner case 32, and thus, the drain pipe may be maintained at an exact mounting position by the drain pipe guides.

A plurality of reinforcing ribs 327 extending radially with respect to the container seating portion hole 325d may be disposed on the inner surface of the inner case 32 corresponding to the container seating portion 301. The reinforcing ribs 327 may provide structural strength to the container seating portion 301. Each of the reinforcing ribs 327 may have a length extending from the container seating portion hole to the first seating portion 324. In addition, each of some of the reinforcing ribs 327 may have a length extending from the container seating portion hole 325d to the second seating portion 325.

A motor mounting portion 326 may be disposed at a position corresponding to the first seating portion 324 inside the inner case 32. The motor mounting portion 326 may be provided in plurality at positions that are symmetrical with respect to the container seating portion hole 325d. The motor mounting portion 326 may be disposed on the reinforcing rib 327 or at an end of the reinforcing rib 327.

In addition, the motor mounting portion 326 may protrude downward from a position corresponding to a top surface of the first seating portion 324 and then be coupled to a housing mounting portion. The motor mounting portion 326 may be disposed at a position corresponding to the housing mounting portion and may include a motor mounting boss 326a that further protrudes downward. The motor mounting boss 326a may pass through the housing mounting portion. In addition, a vibration-proof member made of rubber or silicon material to damp vibration may be further provided around the mounting boss 326a. In addition, an upper end of the motor assembly 50 may be fixed to a bottom surface of the first seating portion 324 by a screw that passes through the housing mounting portion and is coupled to the motor mounting portion 326.

A detection device 39 for detecting the mounting of the container 10 may be provided inside the container seating portion 301. The detection device 39 is provided inside the second seating portion 325. When the container 10 is mounted on the container mounting portion 301, the detection device 39 may detect whether the container 10 is mounted and the type of the container 10 through the detection of the detection member 104 provided in the container 10.

A detection device accommodation portion 329 may be disposed inside the second seating portion 325 for mounting the detection device 39. The detection device accommodation portion 329 connects the outer surface of the second seating portion 325 to the inner surface of the insertion space 325a to define an accommodating space 329a in which the detection device 39 is accommodated.

When the second seating portion 325 is molded, a space may be defined between the outer surface of the second seating portion 325 and the inner surface of the insertion space 325a. In addition, the detection device accommodation part 329 may partition the inside of the space to provide a space in which the detection device 39 may be inserted and accommodated.

For example, the detection device accommodation portion 329 may be defined at a position corresponding to the coupling support portion 325b. The coupling support portion 325b has a structure protruding to the inside of the insertion space 325a, the outer surface of the coupling support portion 325b is in contact with the container coupling portion 103, and the inner surface of the coupling support portion 325b may be spaced apart from the outer surface of the second seating portion 325. Thus, a space in which the detection device accommodation portion 329 may be defined may be provided between the inner surface of the coupling support portion 325b and the second seating portion 325.

The detection device accommodation portion 329 may be defined at each of the plurality of coupling support portions 325b. As an example, the detection device accommodation portion 329 may be defined at four positions among the six coupling support portions 325b, and two detection device accommodation portions 329 may be formed at positions facing each other and may be continuously arranged with each other. The detection device accommodation portion 329 is arranged to be symmetrical with respect to the center of the container seating portion 301 to ensure constant detection of the detection member 104 regardless of the mounting direction of the container 10. Of course, if the detection device accommodation portion 329 may distinguish various containers by detecting the detection members 104 arranged in various shapes, the arrangement number and arrangement thereof may be variously changed.

The detection device accommodation portion 329 may be formed in the shape of a pair of plates defining a space between the outer surface of the recessed second seating portion 325 and the inner surface of the insertion space 325a. The detection device accommodation portion 329 may be opened downward, and the detection device 39 may be inserted from the bottom to the top so as to be positioned between the detection device accommodation portions 329. In this case, the detection device guide 329b supporting both sides of the detection device 39 may be provided on the inner surface of the detection device accommodation portion 329. The detection device guide 329b may be formed to extend upward from both lower ends of the detection device accommodation portion 329. Thus, when the detection device 39 is inserted and mounted in the detection device accommodation portion 329, the detection device 39 may be guided to the accurate position and the detection device 39 may not be moved and may be maintained in a fixedly mounted state.

A detection device fixing portion 328 may be disposed outside the detection device accommodation portion 329. The detection device fixing portion 328 may be configured to fix and mount one side of the detection device 39 and may be disposed at a position corresponding to the top surface of the first seating portion 324. The detection device fixing portion 328 may be coupled by a screw at one side and extending outward from the detection device accommodation portion 329 in the state in which the detection device 39 is inserted into the detection device accommodation portion 329 so that the detection device 39 is fixed. Thus, the detection device 39 may be maintained in the fixed state inside the detection device accommodation portion 329.

In addition, fixing protrusions 328a may be provided on both sides of the detection device fixing portion 328. The fixing protrusion 328a may pass through both sides of the detection device 39 to prevent the detection device 39 from falling. Thus, the detection device 39 may maintain a state in close contact with the inner surface of the coupling support portion 325b in a state of being mounted on the detection device accommodation portion 329. Thus, the container 10 may be easily detected by the detection member 104 by maintaining a state close to the detection member 104 when the container 10 is mounted on the container seating portion 301. In addition, the detection device 39 is fixed by the fixing protrusion 328a so that the detection device 39 may be temporarily fixed before the screw is coupled to the detection device fixing portion 328.

The detection device 39 may include a bracket portion 391 and a detection portion 392. The bracket portion 391 and the detection portion 392 may be coupled to each other in a separately molded state. The detection portion 392 may be mounted on the bent bracket portion 391.

The bracket portion 391 is formed so that the detection device 39 may be fixed and mounted to the inner case 32. The bracket portion 391 may be formed in a plate shape parallel to the top surface of the first seating portion 324. In addition, a bracket hole 391a into which the detection device fixing portion 328 is inserted may be defined in the center of the bracket portion 391. The bracket hole 391a may be formed to pass through the center of the bracket portion 391. The detection device fixing portion 328 may have an end exposed through the bracket hole 391a, and the screw may be coupled to constrain the bracket portion 391.

In addition, fixing grooves 391b into which the fixing protrusions 328a are inserted may be defined on both sides of the bracket hole 391a. The fixing protrusion 328a may be inserted into the fixing groove 391b when the detection device fixing portion 328 is inserted into the bracket hole 391a. The fixing groove 391b may be formed in a shape corresponding to the fixing protrusion 328a. In addition, the fixing groove 391b may be formed to be recessed from both ends of the bracket portion 391. And, although not shown, a wire supplying power and transmitting a signal to the detection device 39 may be connected to the bracket portion 391.

The detection portion 392 may extend vertically from the bracket portion 391. The detection portion 392 may be formed to be inserted into the accommodation space 329a, and both sides thereof may be supported by the detection device guide 329b. At least a portion of the detection portion 392 may extend along the inner side of the accommodation space 329a and may extend to at least a position facing the detection member 104.

The detection portion 392 may be disposed to be in contact with the circumferential surface of the accommodation space 329a, and may be located inside the coupling support portion 325b. In addition, at least a portion of the detection portion 392 is disposed at a position facing the detection member 104 so as to be positioned adjacent to each other when the container 10 is mounted on the container seating portion 301. For example, the detection member 104 may be a magnet, and the detection portion 392 may be a Hall sensor. In this case, the detection portion 392 may be located in a distance that the magnetic force of the detection member 104 may extend.

The detection member 104 and the detection device 39 may be configured in various ways so as to detect proximity to each other. For example, the detection member 104 may be composed of a radio frequency identification (RFID) tag in addition to a magnet, and the detection portion may be configured with an RFID reader.

Hereinafter, the recognition operation of the container 10 of the blender 1 having the above-described structure will be described in more detail with reference to the drawings.

Figure 18:
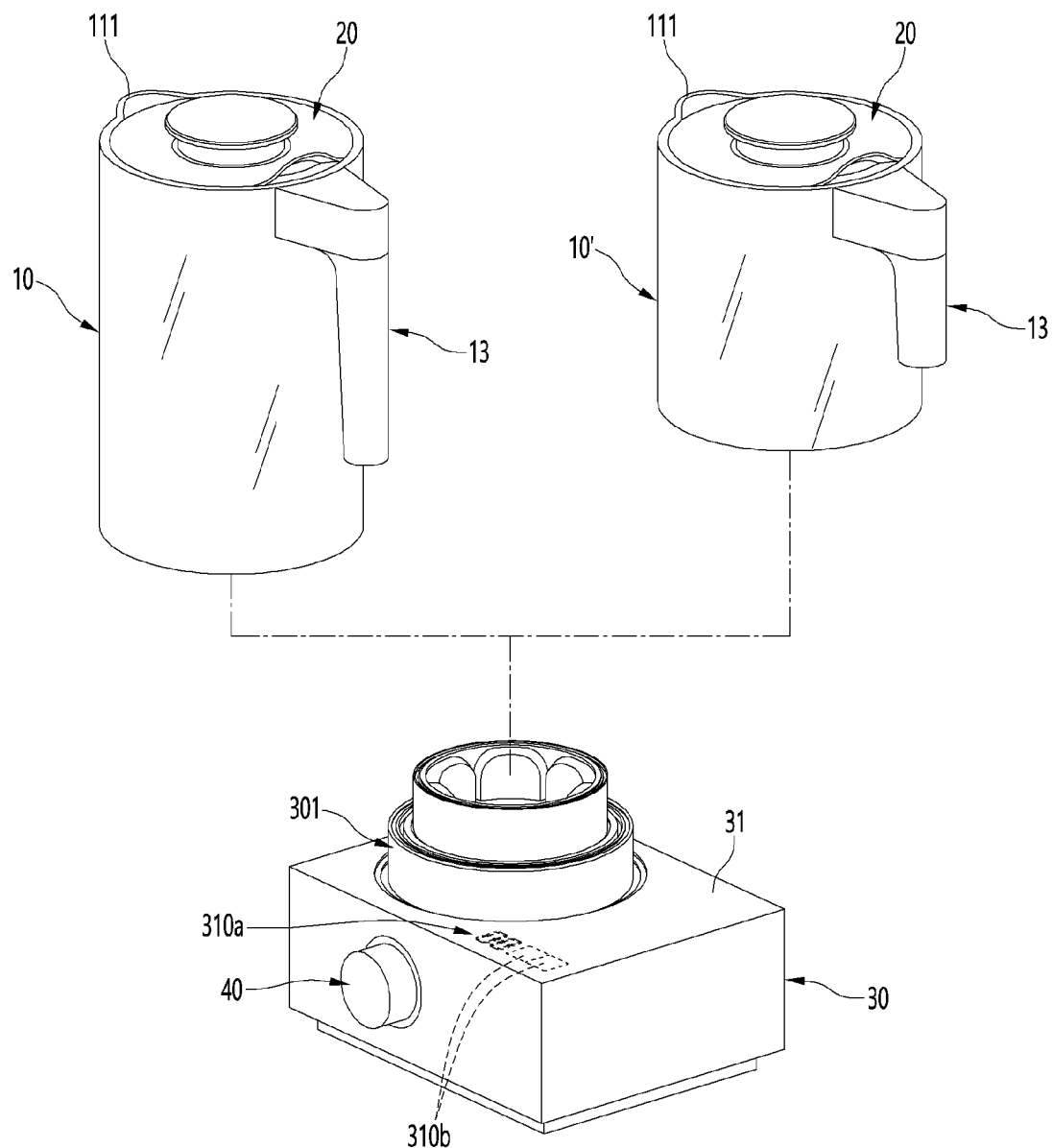
FIG. 18 is a view illustrating a state in which different types of containers are selectively mounted on the body.
Figure 19:
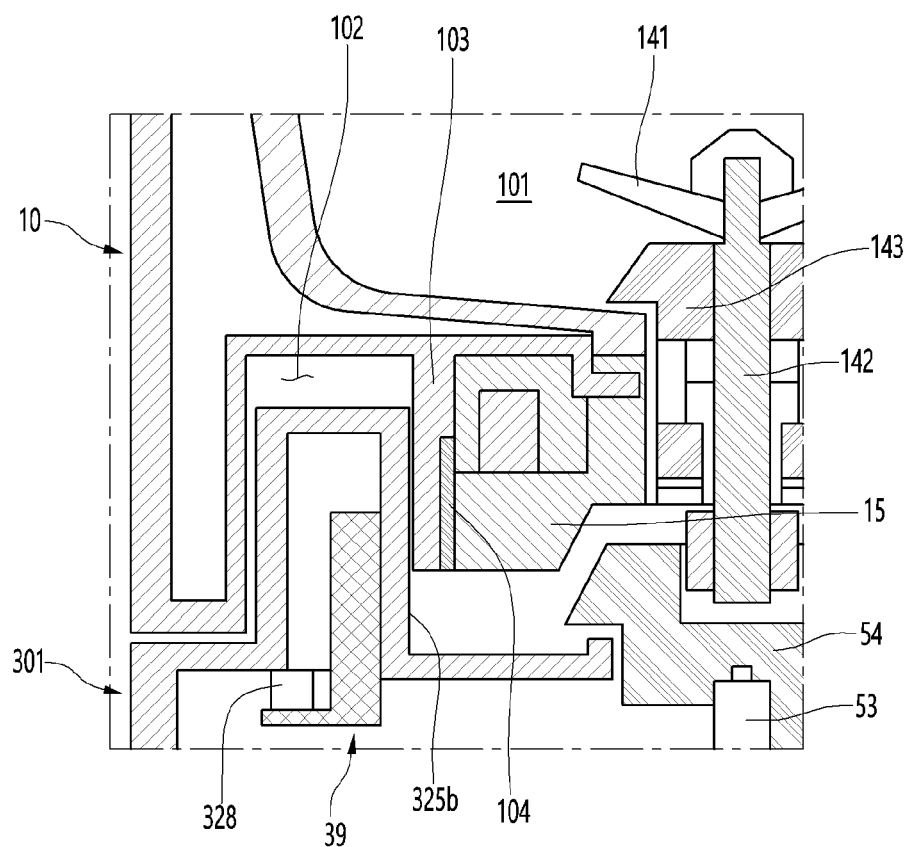
FIG. 19 is a partial cross-sectional view illustrating a state when the detection device detects a detection member.
Figure 20:
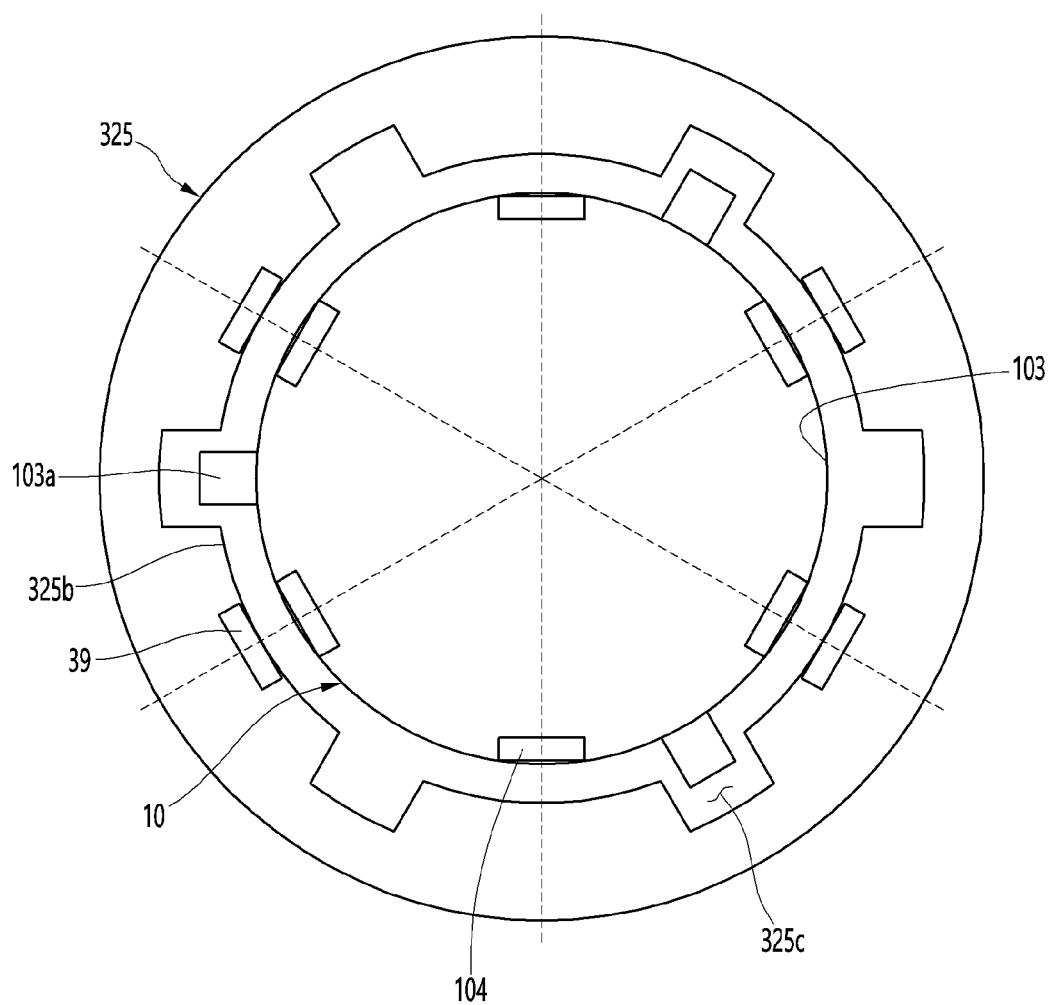
FIG. 20 is a view schematically illustrating a recognized state of the container.

FIG. 18 is a view illustrating a state in which different types of containers are selectively mounted on the body. FIG. 19 is a partial cross-sectional view illustrating a state when the detection device detects a detection member. FIG. 20 is a view schematically illustrating a recognized state of the container.

As shown in the drawings, the container 10 is mounted on the body 30 for use of the blender 1. In addition, when the container 10 is mounted, the body 30 may recognize the mounting of the container 10, and may recognize the type of the container 10 as necessary.

For example, the container 10 includes a first container 10 used in the blender 1 for crushing processing of general food, and a second container 10' used for a specific purpose, such as a rice polishing machine for separating the husks of grains such as rice. Of course, the container 10 may further include other containers having a configuration suitable for other purposes.

All of these containers 10 and 10' may have different internal structures, but the mounting structure with the body 30 may be the same. Thus, the user may use the container suitable for a necessary use by mounting the container on the body 30.

A container coupling portion 103 may be formed in the lower portion of the container 10, and the container coupling portion 103 may be inserted into the insertion space 325a inside the container seating portion 301. In this case, the coupling guide 103a may be inserted into the guide coupling groove 325c so that the container 10 may be aligned and mounted in an accurate position.

In a state in which the container coupling portion 103 is completely inserted into the insertion space 325a, the coupling support portion 325b may be disposed in contact with the outer surface of the container coupling portion 103. In addition, in such a state, the detection member 104 inside the container coupling portion 103 may be recognized by the detection device 39.

That is, when the container 10 is aligned by the coupling of the coupling guide 103a and the container coupling portion 103, the container 10 may always be disposed such that the detection member 104 and the detection device 39 face each other.

As illustrated in FIG. 20, in the case of the first container 10, all six detection members 104 may be provided at equal intervals. That is, the detection members 104 may be spaced apart from each other in a state of being separated at intervals of 60° with respect to the center of the first container 10.

In addition, when the detection device 39 is disposed inside the container seating portion 301 corresponding to the detection member 104, the detection device 39 detects the mounting of the first container 10 by recognizing the detection member 104 when the first container 10 is mounted.

Particularly, a plurality of the detection devices 39 may be provided, and a pair may be disposed to be symmetrical on the left and right sides. In this case, the arrangement position of the detection device 39 may correspond to at least a portion of the arrangement position of the detection member 104.

For example, the detection device 39 may be provided in two on the left and right sides except for the upper end and the lower end of the central axis among the positions separated at intervals of 60° with respect to the center of the container seating portion 301 corresponding to the center of the first container 10, Therefore, no matter what direction the first container 10 is inserted, when the first container 10 is inserted into and seated in the container seating portion 301, four detection members 104 among the six detection members 104 may be recognized by the four detection devices 39, respectively.

That is, when the detection member 104 is recognized by each of the four detection devices 39, the controller may recognize that the first container 10 is mounted. In addition, the controller may automatically set a preset operation mode suitable for the first container 10 as a basic operation mode, and may enable operation in a preset operation mode when the user manipulates. Thus, it is possible to perform an operation suitable for the first container 10 without a separate setting operation.

The second container 10' may be mounted on the body according to the user's selection.

Hereinafter, a state in which the second container 10' is mounted will be described with reference to the drawings.

Figure 21:
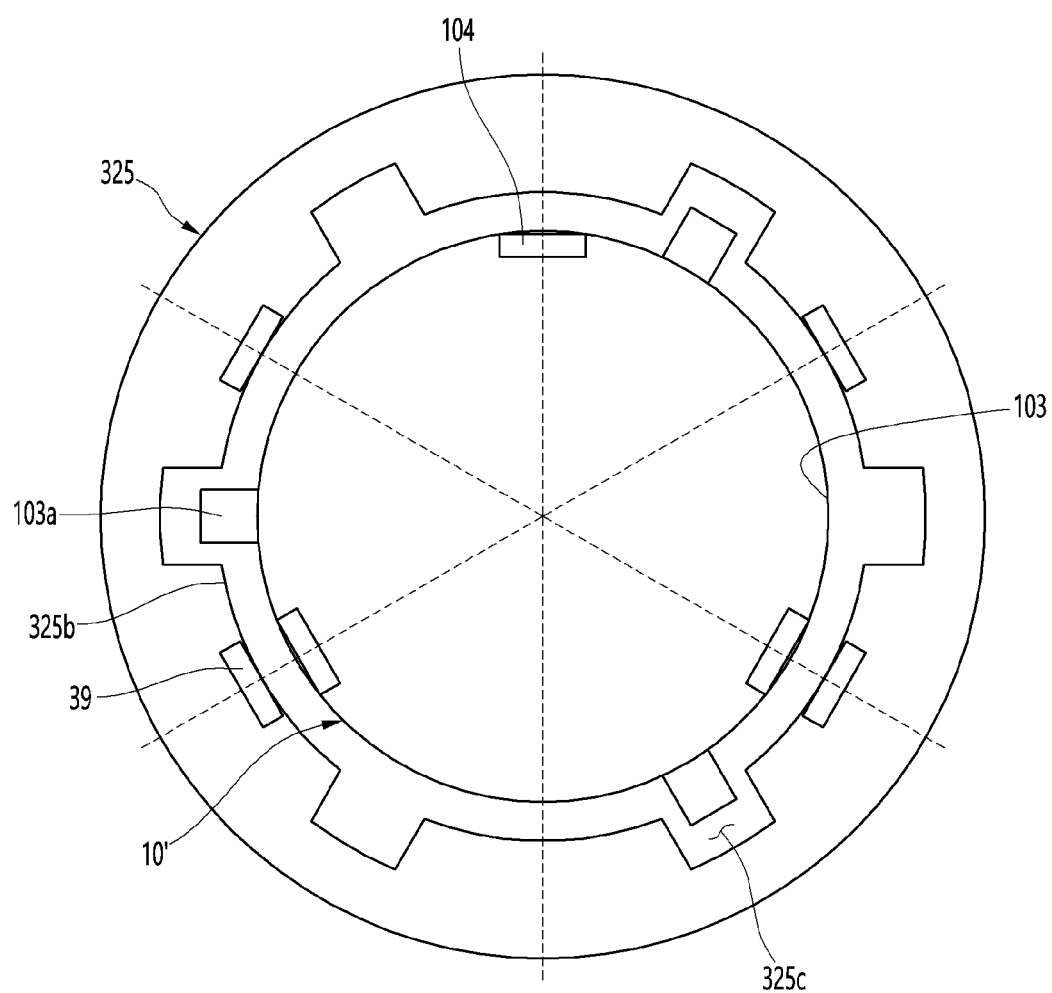
FIG. 21 is a view schematically illustrating a recognized state of the other container.

FIG. 21 is a view schematically illustrating a recognized state of the other container.

As illustrated, when the user wants to use the second container 10', the second container 10' is mounted on the container seating portion 301. In this case, the mounting method of the second container 10' may be the same as the above-described mounting method of the first container 10.

Thus, the second container 10' may be mounted on the container seating portion 301 in a state of being aligned by the coupling guide 103a and the guide coupling groove 325c.

In the case of the second container 10', all three detection members 104 may be provided at equal intervals. That is, the detection members 104 may be spaced apart from each other in a state of being separated at intervals of 120° with respect to the center of the second container 10'.

In addition, when the detection devices 39 are disposed inside the container seating portion 301 corresponding to the detection member 104, the detection devices 39 detect the mounting of the second container 10' by recognizing the detection members 104 when the second container 10' is mounted.

Particularly, a plurality of the detection devices 39 may be provided, and a pair may be disposed at symmetrical positions on the left and right sides, respectively. For example, the detection device 39 may be provided in two, a total of four, on the left and right sides except for the upper end and the lower end of the central axis among the six positions separated at intervals of 60° with respect to the center of the container seating portion 301 corresponding to the center of the first container 10, Therefore, no matter what direction the second container 10' is inserted, when the container coupling portion 103 is inserted and seated in the container seating portion 301, two detection members 104 among the three detection members 104 may be recognized by the detection device 39, respectively.

That is, when the detection member 104 is recognized only by two detection devices 39 among the four detection devices 39, a controller (e.g., microprocessor) may recognize that the second container 10' is mounted. In addition, the controller may automatically set the operation mode set to be suitable for the second container 10' as a basic operation mode, and may enable operation in a preset operation mode when the user manipulates. Thus, it is possible to perform an operation suitable for the second container 10' without a separate setting operation.

The blender according to the embodiment of the present invention may include a body provided with a motor assembly, a container which is detachably mounted to the body and in which the food container is accommodated, a blade module provided inside the container and connected to the motor assembly to rotate when the container is mounted, a detection member provided in the container, and a detection device provided at a position corresponding to the detection member to detect the detection member when the container is mounted.

A container coupling portion protruding downward and provided with the detection member is defined on the bottom surface of the container, the container coupling portion is inserted into the top surface of the body when the container is mounted, and a container seating portion to which the detection device is mounted may be formed.

The lower end of the blade module is exposed at the center of the container coupling portion, and the upper end of the motor assembly coupled to the lower end of the blade module may be exposed at the center of the container seating portion.

The detection member may be provided on the circumference of the container coupling portion, and the detection device may be provided on the inner surface of the container seating portion corresponding to the detection member.

The container coupling portion protrudes in a circular shape to come into contact with the inner surface of the insertion space, and the detection members may be disposed at regular intervals along the circumference of the container coupling portion.

The detection member and the detection device may be disposed at positions facing each other, and at least a portion of the detection member and the detection device may be disposed at positions overlapping each other.

The container coupling portion may protrude from the center of the container with a set radius, and the container seating portion may be recessed to support the outer surface of the container coupling portion.

A plurality of coupling guides protruding outward at equal intervals are formed around the container coupling portion. In the container mounting portion, a plurality of coupling support portions spaced apart from each other at equal intervals to support the outer surface of the container coupling portion, and a guide coupling groove into which the coupling guide is inserted between the coupling support portions spaced apart from each other may be formed.

At least one detection member may be disposed between the adjacent coupling guides.

The detection device may be provided in the coupling support portion.

The detection device may be disposed so as to be symmetrical at positions facing each other among a plurality of the coupling support portions.

The container seating portion may protrude upward, and a detection device accommodation portion in which the detection device is inserted and mounted may be formed by opening downward between the inner and outer surfaces of the container seating portion spaced apart from each other.

The detection device may include a detection portion which is inserted inside the detection device accommodation portion and at least a portion of which is located at a position facing the detection member to detect the detection member, and a bracket portion on which the detection portion is mounted and which is coupled to the inner surface of the body from the outside of the detection device accommodation portion.

The detection device accommodation portion may be provided with detection device guides supporting the detection portion from both sides.

A plurality of the detection members may be disposed radially with respect to the center of the container, and the detection device may be formed at a position corresponding to a portion of the detection member and disposed radially with respect to the center of the body.

One of the plurality of containers may be selectively mounted on the container seating portion, and the plurality of containers may be configured to have a different arrangement position of the detection member.

One of the plurality of containers may be selectively mounted on the container seating portion, and the plurality of containers may be configured so that the arrangement number of the detection members are different.

The detection member may be a magnet, and the detection device may be a Hall sensor sensing a magnet.

The detection member may be an RFID tag, and the detection device may be an RFID reader recognizing the RFID tag.

The motor assembly may be configured to operate only when the detection member is recognized by the detection device.

INDUSTRIAL APPLICABILITY

Since the blender according to the embodiment of the present invention can guarantee operation reliability and improve ease of use, industrial applicability is high.

The invention claimed is:

1. A blender comprising:
a body including a motor assembly;
a container detachably seatable to the body and to accommodate food;
a blade module provided inside the container and connected to the motor assembly to rotate when the container is mounted;
a detection member disposed in the container; and
a detection device disposed on one side of the body corresponding to the detection member to detect the detection member when the container is mounted, and
wherein the container includes a container coupling portion protruding downward and the detection member is disposed at a bottom surface of the container, and the container coupling portion includes a plurality of coupling guides protruding outward at equal intervals from the outer surface of the container coupling portion, and
the body includes a container seating portion disposed at a top surface of the body, the container seating portion including the detection device and being recessed to receive the container coupling portion when the container is seated at the body, and
the container seating portion includes a plurality of coupling support portions to support the outer surface of the container coupling portion and are spaced apart from each other at equal intervals at the inner surface of the container seating portion, and a guide coupling groove disposed between two coupling support portions among the plurality of coupling support portions into which a coupling guide among the plurality of coupling guides is received.

2. The blender of claim 1, wherein the container coupling portion extends downward from a position away from a center of the container by a set radius, and the detection member is disposed along a circumference of the container coupling portion, and
an inner surface of the container seating portion is in contact with an outer surface of the container coupling portion when the container is seated at the body, and the detection device is disposed at the container seating portion to face the detection member.

3. The blender of claim 1, wherein the detection member is disposed between two coupling guides among the plurality of coupling guides.

4. The blender of claim 1, wherein the detection device is provided in a coupling support portion among the plurality of coupling support portion.

5. The blender of claim 1, comprising a plurality of detection devices disposed symmetrically among the plurality of coupling support portions.

6. The blender of claim 1, wherein a detection device accommodation portion is formed inside a coupling support portion among the plurality of coupling support portions into which the detection device is accommodated.

7. The blender of claim 6, wherein the detection device comprises:
a detection portion which is accommodated in the detection device accommodation portion and at least a portion of which is located at a position to face the detection member to detect the detection member when the container is seated at the body; and
a bracket portion on which the detection portion is mounted and fixes the detection portion to the detection device accommodation portion.

8. The blender of claim 1, wherein a plurality of detection members are arranged radially with respect to a center of the container, and
the detection device is disposed radially with respect to the center of the body, and is disposed at a position at the container seating portion such that when the container is seated at the body, the detection device faces a detection member of the plurality of detection members.

9. The blender of claim 1, wherein the detection member is a magnet, and
the detection device is a Hall sensor that detects the magnet.

10. The blender of claim 1, wherein the detection member is an RFID tag, and
the detection device is an RFID reader recognizing the RFID tag.

11. A blender comprising:
a body including a motor assembly;
a container detachably seatable to the body and to accommodate food;
a container coupling portion protruding downward and the detection member is disposed at a bottom surface of the container;
a blade module provided inside the container and connected to the motor assembly to rotate when the container is mounted;
a detection member disposed in the container;
a container seating portion disposed at a top surface of the body, the container seating portion including the detection device and being recessed to receive the container coupling portion when the container is seated at the body; and
a detection device disposed on one side of the body corresponding to the detection member to detect the detection member when the container is mounted, and, wherein a plurality of containers have a different arrangement position based on a plurality of the detection members, and when one of a plurality of containers is seated at the container seating portion, the blender includes a controller;

the container seating portion including a plurality of detection devices, wherein the controller is configured to determine a type of the seated container according to the arrangement of the plurality of detection members detected by the plurality of detection devices.

12. The blender of claim 11 wherein the controller is configured to set to an operation mode for the container based on the type of the seated container.

13. A blender comprising:

a body including a motor assembly;

a container detachably seatable to the body and to accommodate food;

a container coupling portion protruding downward and the detection member is disposed at a bottom surface of the container a blade module provided inside the container and connected to the motor assembly to rotate when the container is mounted;

a detection member disposed in the container;

a container seating portion disposed at a top surface of the body, the container seating portion including the detection device and being recessed to receive the container coupling portion when the container is seated at the body; and a detection device disposed on one side of the body corresponding to the detection member to detect the detection member when the container is mounted, and wherein a plurality of containers have a different arrangement based on a number of detection members, and when one of a plurality of the containers is seated at the container seating portion, the blender includes a controller;

the container seating portion including a plurality of detection devices, wherein the controller is configured to determine a type of the seated container according to the arrangement based on the number of the detection members detected by the plurality of detection devices.

14. The blender of claim 13 wherein the controller is configured to set to an operation mode for the container based on the type of the seated container.

* * * * *